US012090385B2

(12) United States Patent
Mueller

(10) Patent No.: US 12,090,385 B2
(45) Date of Patent: Sep. 17, 2024

(54) CARDIORESPIRATORY FITNESS OPTIMIZER APPARATUS

(71) Applicant: James F. Mueller, Overland Park, KS (US)

(72) Inventor: James F. Mueller, Overland Park, KS (US)

( * ) Notice: Subject to any disclaimer, the term of this patent is extended or adjusted under 35 U.S.C. 154(b) by 491 days.

(21) Appl. No.: 17/506,771

(22) Filed: Oct. 21, 2021

(65) Prior Publication Data

US 2022/0040555 A1 Feb. 10, 2022

Related U.S. Application Data

(63) Continuation-in-part of application No. 16/234,774, filed on Dec. 28, 2018, now Pat. No. 11,192,017.

(51) Int. Cl.
*A63B 71/08* (2006.01)
*A62B 9/02* (2006.01)

(52) U.S. Cl.
CPC .............. *A63B 71/085* (2013.01); *A62B 9/02* (2013.01)

(58) Field of Classification Search
CPC .............. A63B 71/085; A63B 21/0085; A63B 2220/56; A63B 21/00069; A63B 2225/50; A63B 2230/06; A63B 23/18; A63B 2071/086; A63B 2230/42; A62B 9/02; A61M 16/049; A61M 16/201; A61M 16/107; A61M 16/20; A61M 16/208; A61F 5/56; A61F 5/566
See application file for complete search history.

(56) References Cited

U.S. PATENT DOCUMENTS

2008/0257358 A1* 10/2008 Stern .................. A61M 16/208 128/200.24
2014/0150801 A1* 6/2014 Rusher ............... A63B 21/0088 128/207.16

FOREIGN PATENT DOCUMENTS

WO WO-2018068085 A1 * 4/2018 .............. A61F 5/56

* cited by examiner

*Primary Examiner* — Ophelia A Hawthorne
(74) *Attorney, Agent, or Firm* — Christopher J. Scott

(57) ABSTRACT

A cardiorespiratory fitness optimizer apparatus includes a mouthpiece and a valve assembly. The mouthpiece includes lower and upper tooth beds and an anterior manifold. The manifold terminates anteriorly at a centralized valve assembly interface and includes at least one air-letting aperture. The valve assembly is matable with the centralized valve assembly interface and includes an adjustable aperture. The user is able to adjust the aperture for increasing and decreasing airflow resistance therethrough for optimizing cardiorespiratory fitness. The cardiorespiratory fitness optimizer apparatus may include at least one sensor for sensing airflow activity within the valve assembly and communicating data relating to the airflow activity to an external device for displaying human readable output relating to the airflow activity upon the external device. The valve assembly is removable from the mouthpiece and replaceable with a plug element for maintaining anterior formations of the mouthpiece when the valve assembly is removed.

20 Claims, 25 Drawing Sheets

CARDIORESPIRATORY FITNESS OPTIMIZER APPARATUS

PRIOR HISTORY

This application is a Continuation-in-Part patent application claiming the benefit of U.S. patent application Ser. No. 16/234,774 filed in the United States Patent and Trademark Office (USPTO) on 28 Dec. 2018, which application claimed the benefit of US Provisional Patent Application No. 62/611,408 filed in the USPTO on 28 Dec. 2017; U.S. Provisional Patent Application No. 62/611,625 filed in the USPTO on 29 Dec. 2017; and U.S. Provisional Patent Application No. 62/676,934 filed in the USPTO on 26 May 2018 which applications are hereby incorporated by reference thereto.

FIELD OF THE INVENTION

This invention generally relates to Respiratory Muscle Trainers or RMT devices, and more particularly to an RMT device incorporated into a mouthpiece for usage during sports training and exercising.

DESCRIPTION OF RELATED ART

The prior art teaches devices that allow for unrestricted airflow through mouthguards into and out of the lungs. As noted in U.S. patent application Ser. No. 16/234,774 ('774 application) to which this application claims a benefit, there is a perceived need in the art to protect the mouth, lips, teeth and jaw by way of the mouthguard, while also training the lungs, improving lung efficiency and muscles via adjustable airflow restriction into and out of lungs through both inspiration and expiration of lungs. The subject matter of the '774 application addresses this perceived need in the art.

State-of-the-art mouthguard systems are typically not designed to allow adjustable restriction of airflow to exercise the lungs. Further, currently available lung trainers, masks and lung exercisers are designed exclusively for lung training and are not designed to be protective of the mouth, nor will they fit under an athletic helmet facemask, with none affording mouth protection, comfort fit, two-way inspiration and expiration resistance lung training with ergo-dynamic fit, feel and low profile to fit under (behind) athletic protective facemasks.

The combination mouthguard and lung exerciser device of the '774 application meets a clear and present need that is unmet in the marketplace. Athletes and non-athlete users alike can employ both mouthguard protection and lung training utility in one combined device, allowing use during practices or other training events to help condition and improve lung function while protecting mouth, teeth, etc. while wearing under or behind an athletic helmet facemask, or not depending upon user need.

It is understood there are prior art devices that restrict airflow into the lungs in order to activate respiratory muscle. There are also many mouthguard devices available for protecting teeth, mouth, gums and soft oral tissue from impact and injury. Mouthguards reduce the chance of injuries resulting from impacts of collisions during athletic competition and sporting events. Various types of mouthguards include: standard-stock-type fit, custom-fit molded to individual's teeth, and non-custom fit for general use.

There are also many lung conditioners, or cardiorespiratory exercisers available which improve overall lung efficiency, strength and stamina by restricting airflow into the lungs through the mouth and nose in order to increase inspiratory and/or expiratory muscle strength and endurance. Various cardiorespiratory training device types are available, some of which are medically specific, while others are sport specific. Some lung trainer devices only provide resistance in airflow upon inspiration while some only offer resistance upon exhalation. Others provide both inspiratory and expiratory resistance.

The restriction of airflow to the lungs through the mouth and nose during exercise enables the body to adjust to a higher level of efficiency of $CO_2$ and $O_2$ exchange and thereby maximizing oxygenation of muscle tissues via vasculature throughout the entire body. This increased lung efficiency, in part, is a function of improved inspiratory and or expiratory muscle strength. Short of training at high altitudes, it is difficult to improve lung function and strengthen respiratory muscles without restricted airflow during normal breathing or during exercise.

The present invention both builds upon and departs from the subject matter of the '744 application. In this regard, it is noted that traditional Respiratory Muscle Training or RMT devices are designed for use while stationary breathing into and out of the device for several minutes at a time several times per week to several times per day. These RMT devices are not designed to be used during exercises. There is thus a perceived need for a mouthpiece with integrated RMT device for enabling athletes to maximize their fitness levels by using the device while exercising, acting as a force multiplier over and above the exercise engaged in. The STEALTH™ brand cardiorespiratory fitness optimizer apparatus according to the present invention is the first device to offer Dual Airflow Restriction (i.e. restricted airflow during both inhalation and exhalation activity) (DAR) to be designed for use during exercise. The device according to the present invention places a significant load on the cardiorespiratory system exercising the heart, lungs and vasculature maximizing cardiorespiratory efficiency via adjustable airflow restriction into and out of lungs through both inspiration and expiration of lungs.

Most RMT systems are not designed to allow dual airflow resistance technology with adjustable restriction of airflow to maximize cardiorespiratory fitness. As prefaced above, currently available lung trainers, masks and lung exercisers are designed exclusively for lung training and are not designed to be used during exercise, nor will they fit under an athletic helmet or facemask. Moreover, none are designed with dual airflow resistance technology having adjustable restriction of airflow to maximize cardiorespiratory fitness with ergo-dynamic fit, feel and low profile to fit under (or behind) athletic protective facemasks.

Thus, the combination mouthpiece and RMT device or cardiorespiratory fitness optimizer apparatus of the present invention meets a clear and present need that is unmet in the marketplace. Athletes (or medical patients with COPD, cardiac rehabilitation, asthma, anxiety, and other ailments) can employ a cardiorespiratory fitness optimizer or maximizer during any and all exercises, or daily activities, practices or other training events to help condition and improve heart, lung and vasculature function. The mouthpiece portion of the present invention may also be used for both mouth and teeth protection with a removable valve body solely as a mouthguard when needed and as an RMT device or cardiorespiratory fitness optimizer apparatus during conditioning sessions or not depending upon user needs as summarized in more detail hereinafter.

SUMMARY OF THE INVENTION

The present invention generally involves a cardiorespiratory fitness optimizer apparatus or combination mouthpiece and Respiratory Muscle Training or RMT device with optional fork-like plug component that may be swapped in and out in place of the RMT portion of the apparatus. The cardiorespiratory fitness optimizer apparatus made the focus of these specifications is designed to optimize cardiorespiratory fitness in keeping with all other embodiments described in these specifications. The cardiorespiratory fitness optimizer apparatus preferably comprises, in combination, a mouthpiece and a valve assembly comprising an upper valve housing section, a lower valve housing section, and a wheel valve element.

The mouthpiece preferably comprises a lower arcuate tooth bed, an upper arcuate tooth bed, and an anterior mouth or manifold section. The anterior mouth or manifold section preferably comprises or provides a valve-receiving orifice and a series of mouthpiece apertures situated posterior to the valve-receiving orifice that extend intermediate the valve-receiving orifice and the lower and upper arcuate tooth beds. Airflow is thereby enabled from the valve-receiving orifice through the series of mouthpiece apertures of the anterior mouth or manifold section of the mouthpiece. The valve assembly is attachable to the mouthpiece and is adjustable for increasing and/or decreasing airflow resistance therethrough for training muscles of the cardiorespiratory system.

The valve assembly, receivable at or matable with the valve-receiving portion of the mouthpiece, is preferably provided by way a housing assembly enclosing the wheel valve element. The valve assembly may thus preferably comprise an upper valve housing section and a lower valve housing section with a wheel valve element therebetween. The upper valve housing section preferably comprises an apertured anterior grill portion, a posterior upper housing edge, and a series of upper channel-forming formations. The upper channel-forming formations preferably extend in parallel relation to one another intermediate the apertured anterior grill portion and the posterior upper housing edge.

The lower valve housing section preferably comprises an anterior window portion, a posterior lower housing edge, and a series of lower channel-forming formations. The series of lower channel-forming formations preferably extend in parallel relation to one another intermediate the anterior window portion and the posterior lower housing edge. The anterior window portion preferably comprises an arcuately shaped air-letting housing window. The wheel valve element preferably comprises an arcuately shaped air-letting wheel window and an axis of rotation. The wheel valve element is received intermediate the upper and lower valve housing sections such that the air-letting housing window and the air-letting wheel window are in variable alignment with one another with the axis of rotation enabling the user to adjust the alignment.

The upper and lower valve housing sections are attachable to one another for enclosing the wheel valve element and together form the valve assembly, which valve assembly is removable from the mouthpiece and replaceable with a fork-like plug element. The upper channel-forming formations join or abut the lower channel-forming formations to form a series of air-letting channels through the valve assembly. The posterior upper housing edge joins or abuts the posterior lower housing edge to form a channel outlet, which channel outlet is insertable into the valve-receiving orifice or otherwise matable therewith such that the series of air-letting channels are placed into alignment with the series of mouthpiece apertures. The axis of rotation of the wheel valve element enables a user to selectively rotate the wheel valve element in clockwise and counter-clockwise directions for selectively maximizing or minimizing window-to-window alignment of the air-letting housing window and the air-letting wheel window for increasing and decreasing airflow resistance therethrough for working lung and respiratory muscles during both inhalation and exhalation activity.

The wheel valve element may further preferably comprise a radially extending arm for enabling the user to more easily and selectively rotate the wheel valve element in clockwise and counter-clockwise directions. Further, the valve assembly may preferably comprise laterally opposed arm-stop structures. A first arm-stop structure of the laterally opposed arm-stop structures limits rotation in a first direction and signals maximal window-to-window alignment while a second arm-stop structure of the laterally opposed arm-stop structures limits rotation in a second direction and signals minimal window-to-window alignment.

The wheel valve element extends and traverses through a wheel-receiving depression formed in the lower valve housing section posterior to the anterior window portion. The wheel-receiving depression preferably comprises an air-diverting lip. The air-diverting lip extends from below the air-letting housing window to the series of lower channel-forming formations for re-directing airflow intermediate the air-letting housing window and the series of air-letting channels. The cardiorespiratory fitness optimizer apparatus may further comprise at least one sensor preferably outfitted at or in adjacency to one or more of the air-letting channels. The sensor(s) sense or detect certain airflow activity within the valve housing assembly and communicate data to an external device for displaying human readable output upon the external device.

As prefaced above, the valve assembly or valve housing assembly is preferably removable from the mouthpiece. In this regard, the mouthpiece may be further outfitted with a separate fork or plug element. The fork or plug element may preferably comprise a series of tines or finger portions and a back portion. The series of tines are dimensioned or configured to be receivable in the series of mouthpiece apertures while the back portion is dimensioned or configured to be receivable in the valve-receiving orifice and the anterior manifold section. The fork or plug element is designed to plug female structures of the mouthpiece and thereby maintain anterior formations or prevent deformations thereof when the valve housing assembly is removed therefrom as might be the case, for example, when the user may opt to boil and bite the mouthpiece to better form the mouthpiece to the user' mouth anatomy.

Other objects and advantages of the present invention will become apparent from the following descriptions, taken in connection with the accompanying drawings, wherein, by way of illustration and example, an embodiment of the present invention is disclosed.

BRIEF DESCRIPTION OF THE DRAWINGS

The drawings constitute a part of this specification and include an exemplary embodiment to the invention, which may be embodied in various forms. It is to be understood that in some instances various aspects of the invention may be shown exaggerated or enlarged to facilitate an understanding of the invention.

FIG. 14 and FIG. 15 are lateral cross-section views of the mouthguard of

FIG. 12.

DETAILED DESCRIPTION OF THE PREFERRED EMBODIMENTS

Detailed descriptions of a preferred embodiment is provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

Terms are used here in a generic and descriptive sense only and not for purposes of limitation. Unless expressly defined, such terms are intended to be given their broad, ordinary and customary meaning not inconsistent with that used in the relevant industry. As used here, the article "a" is intended to include one or more items. Where only one item is intended, the term "one", "single", or similar language is used.

The cardiorespiratory fitness optimizer apparatus of the present invention includes a mouthpiece that protects lips (when optional lip shield is used), teeth, gums, soft tissue while simultaneously providing a lung exerciser used for breathing exercises through airflow resistance to both inspiration and expiration of the user's lungs thus improving lung efficiency and inspiratory and expiratory muscle strength.

The cardiorespiratory fitness optimizer apparatus with mouthguard or mouthpiece can be configured and/or adjusted to afford resistance free breathing and multiple (up to infinite) resistance to breathing levels which offer varying levels of airflow to and from the user's lungs, depending upon the level of conditioning and desired needs of the user. As with other resistance training exercises, inhalation and exhalation resistance training can improve lung performance, cardiorespiratory efficiency and overall athletic performance. In certain embodiments, the present invention provides no airflow resistance, or multiple airflow resistances for both inspiratory and expiratory respiration lung conditioning.

Figure 1:
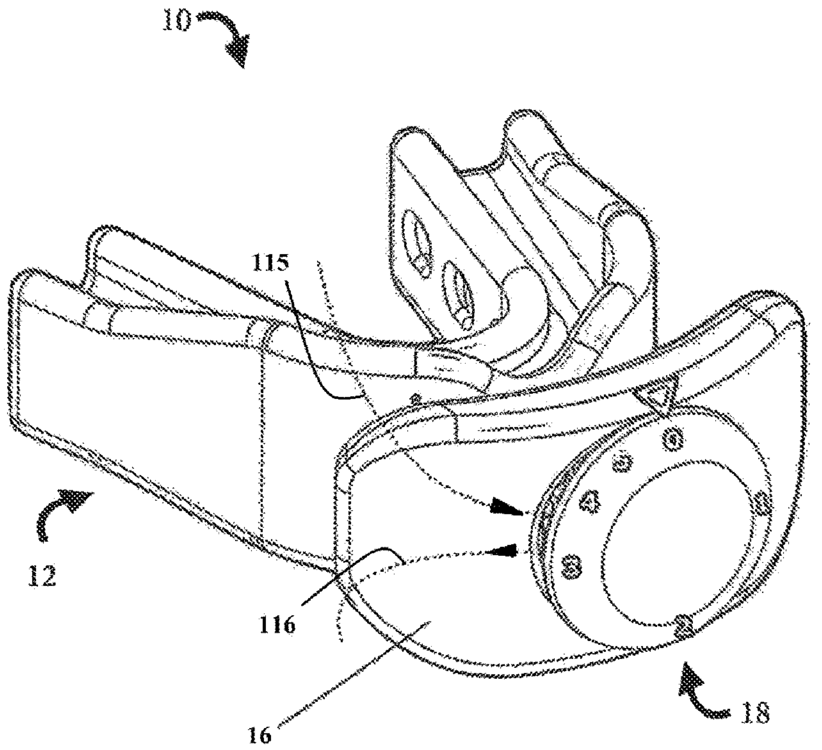
FIG. 1 shows a first preferred embodiment of an athletic mouthguard with variable airflow-restricting valve according to the invention.
Figure 2:
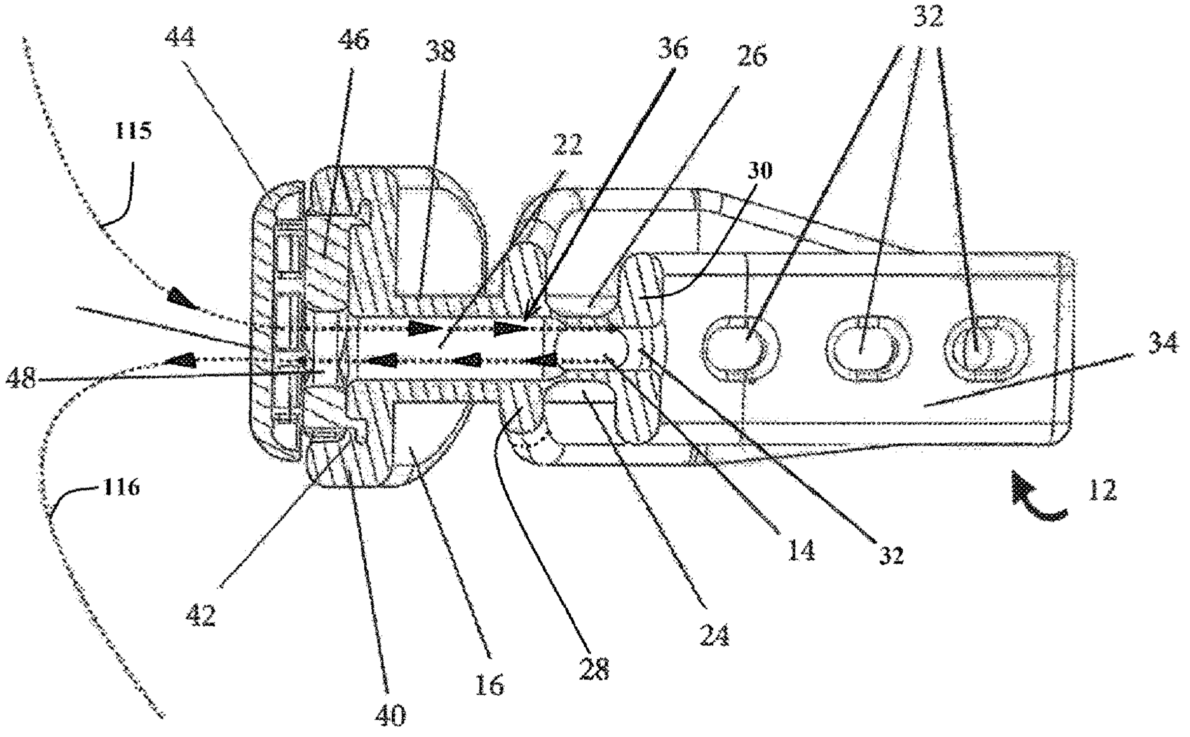
FIG. 2 is a side elevation view of the mouthguard of FIG. 1 in partial cross-section.
Figure 3:
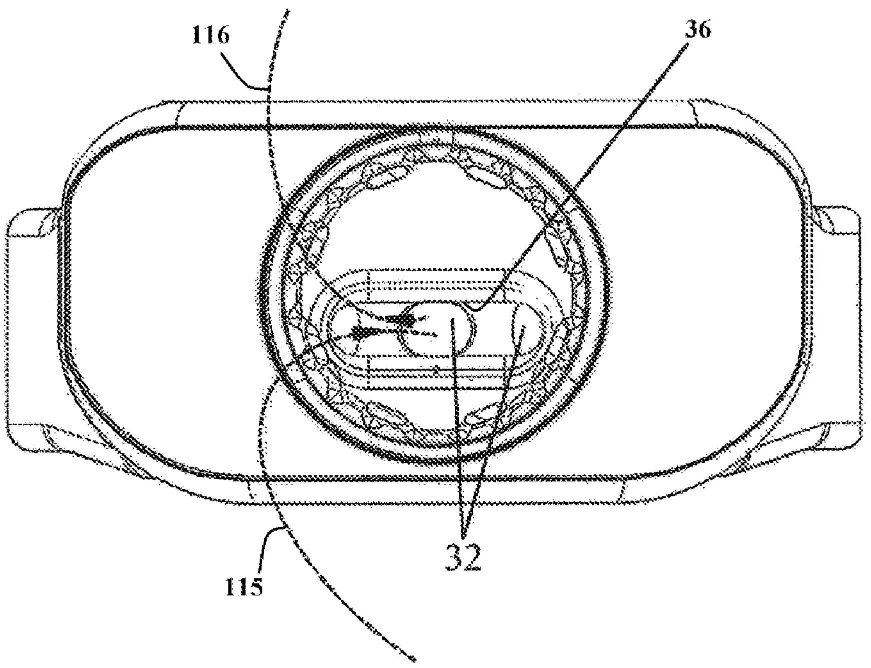
FIG. 3 is a front elevation view of the mouthguard of FIG. 1.
Figure 4:
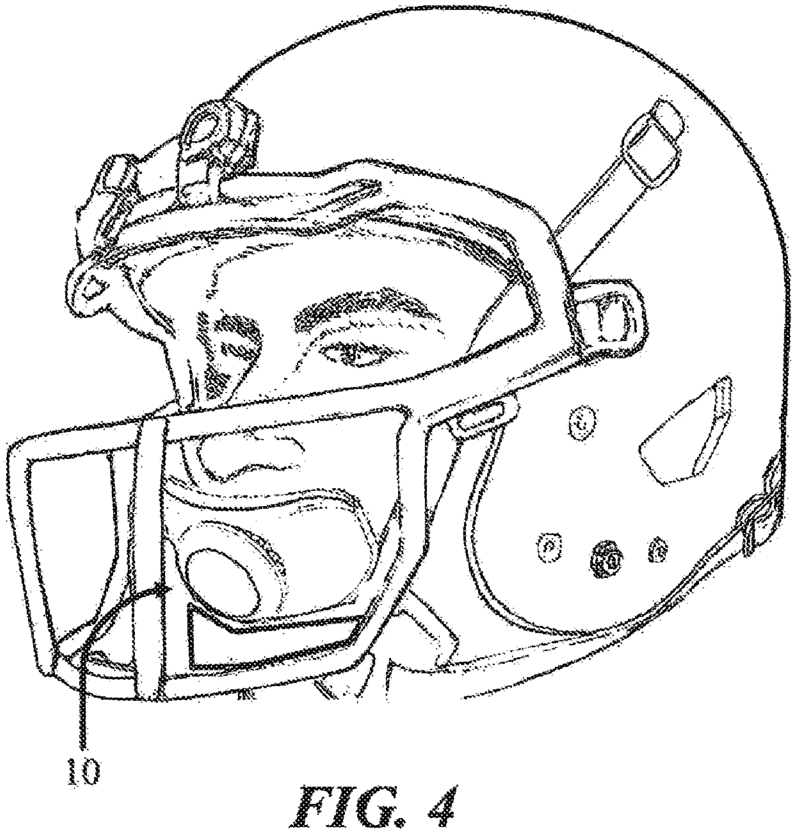
FIG. 4 depicts an athlete using the mouthguard of FIG. 1 while wearing an athletic helmet with facemask.
Figure 5:
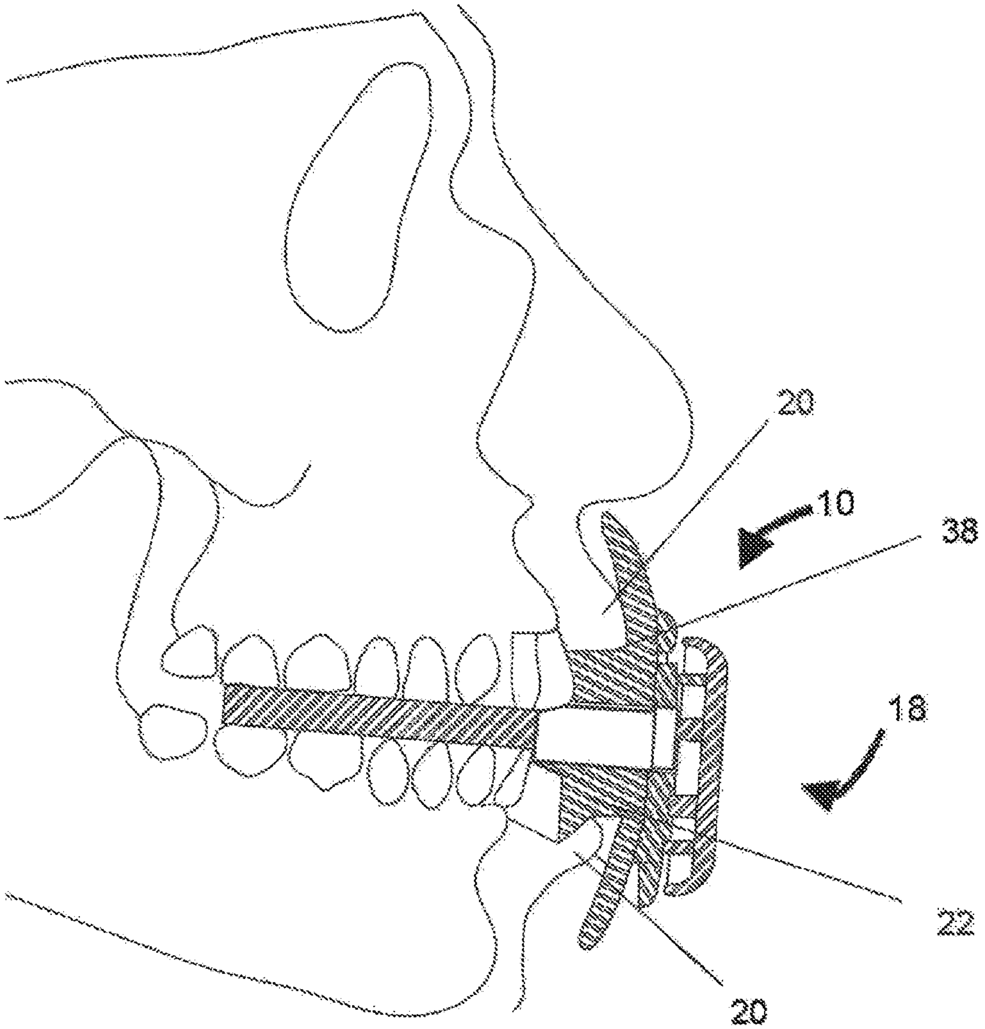
FIG. 5 is a cross-sectional depiction of how the mouthguard of FIG. 1 may be used.
Figure 6:
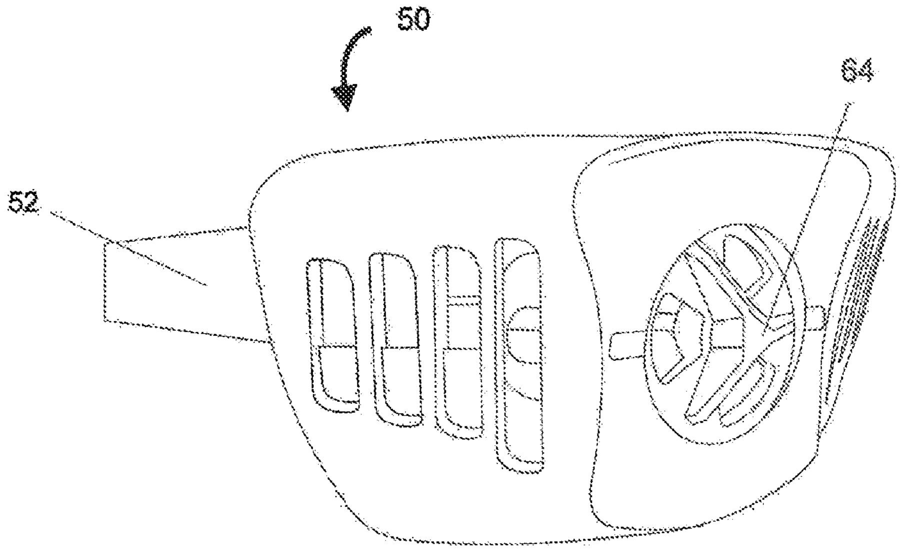
FIGS. 6-9 show a second preferred embodiment of an athletic mouthguard with variable airflow-restricting valve according to the invention.
Figure 7:
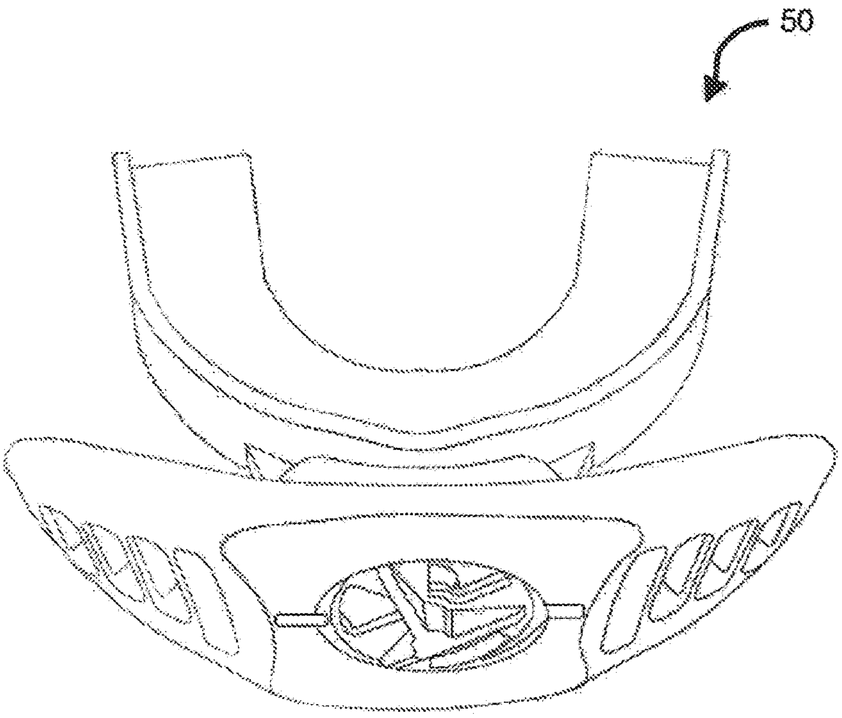
Figure 8:
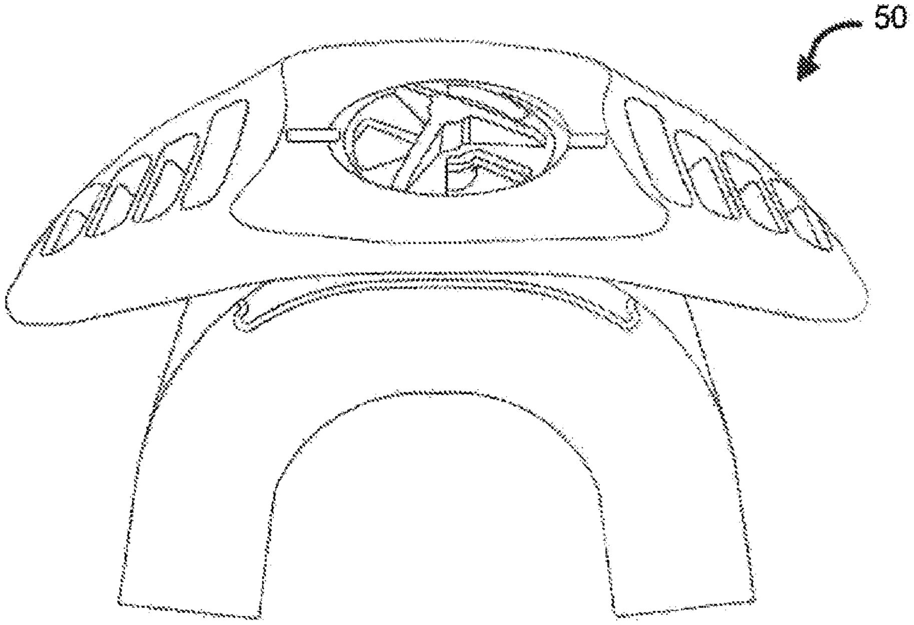

FIGS. 1-3 show a first preferred embodiment of a cardiorespiratory fitness optimizer apparatus 10 with mouthpiece and compact lung exerciser variable airflow-restricting valve according to the invention which can be used by athletes wearing helmets with facemasks as shown in FIG. 4. Cardiorespiratory fitness optimizer apparatus 10 generally comprises mouthpiece 12 with integrated airflow channel 14 (FIG. 2), and lip protector 16 with integrated adjustable airflow-restricting valve 18 connected to airflow channel 14. Athletes can hold cardiorespiratory fitness optimizer apparatus 10 in their mouths as shown in FIG. 5 with their lips 20 pressed against the walls of airflow port 22, allowing themselves to only breath through integrated airflow channel 14 and adjustable airflow-restricting valve 18. It is contemplated, in certain versions of this preferred embodiment, lip protector 16 would not be included. In these versions, adjustable airflow-restricting valve 18 would generally maintain the same configuration, but without lip protector 16 extending outwardly from valve 18 as is shown in the drawings.

FIG. 2 shows airflow channel 14 is integrated into mouthpiece 12 between its lower (24) and upper (26) tooth beds and is defined by outer sidewall 28 and inner sidewall 30. A plurality of apertures 32 within inner sidewall 24 allow a person holding cardiorespiratory fitness optimizer apparatus 10 in their mouth, as shown in FIG. 5, to breathe through airflow channel 14 and connected adjustable valve 18. Apertures 32 are spaced along inner sidewall 24, including near molar sections 34 of mouthpiece 12, which allows the user to inhale and exhale through the entire arcuate shape of mouthpiece 12.

Adjustable airflow-restricting valve 18 is connected to mouthpiece 12 through airflow port 22 which is in fluid communication with airflow channel 14 through aperture 36 in outer sidewall 28. Airflow port 22 (with its surrounding valve body wall structure) extends outwardly from mouthpiece 12 to create lip rest area 38 where the user's lips 20 (FIG. 5) rest during use. In one preferred embodiment, lip rest area 38 extends approximately ½ inch to 1 inch from outer side wall 28, such that cardiorespiratory fitness optimizer apparatus 10 can comfortably fit behind (underneath) a facemask of an athletic helmet, as shown in FIG. 4.

One important consideration in designing the size and shape of valve 18 is balancing the weight of valve 18 in relation to the weight of mouthpiece 12 such that the overall weight of cardiorespiratory fitness optimizer apparatus 10 is not front-heavy when held in the mouth of a user. Another important consideration in designing the size and shape of valve 18 is making it easily wearable behind athletic facemasks, as previously mentioned. Valve body 40 has annular valve seat 42 in which rotatable valve member 44 may be selectively rotated. As perhaps best be appreciated in FIG. 2, valve member 44 has restricting wall portion 46 and airflow window aperture 48 which can be selectively rotated in front of airflow port 22 to selectively restrict airflow through port 22 and thereby through airflow channel 14 of mouthpiece 12.

The adjustable airflow-restricting valve offers various levels of airflow from no (minimal) resistance, to any one of a number of airflow resistance levels, in to and out of the lungs through the adjustable valve. Preferred embodiments restrict both inspiratory and expiratory airflow through a two-way adjustable valve, thus working the lung muscles for both inhalation and exhalation, causing the cardiorespiratory system to become more efficient and stronger. However, the scope of the invention is not limited specifically to two-way valves; the valve can easily be interchanged with a one-way valve restriction if preferred, either inspiratory or expiratory, although research indicates both inspiratory and expiratory restriction for best lung conditioning.

Valve 18 has rotatable dial valve member 44 which rotates in clockwise and counter clockwise directions to allow maximum flexibility in offering the user no airflow resistance when set to 0, to increasing resistance from level 1 to maximum resistance airflow at level 5. This unit is currently configured for use with or without nose plug or clips, however, the most highly conditioned athletes could use with nose plugs or clips. Users may attach nose plugs to the top of lip shield 16 with string or a strap (not shown) if needed, however most users will not likely use nose plugs.

Mouthpiece 12 should be constructed or molded, preferably, from a firm but flexible FDA approved compounding material such as thermoplastic polyurethane (TPU) or similar, ethylene vinyl acetate (EVA), or other siliconized rubber type materials which absorb and diffuse impact throughout the entire mouthpiece. Adjustable airflow valve 18 should be constructed of medium density thermoplastic or similar material which is shatterproof and somewhat flexible. Cardiorespiratory fitness optimizer apparatus 10 is constructed or, more particularly, molded around the airflow channel to contain a large breathing orifice, in which the preferred shape of orifice is oval in design, but not limited to that particular shape.

The orifice originates and follows the curvature of the lip shield and continues inward, surrounded by an airflow port which user's lips contact and rest upon when in use. Additionally, part of the airflow port (22) is a protective lip flange structure (16) which helps to protect the front teeth and gums from the rear side of the lip flange structure as well as support and stabilize the tooth pads (24, 26) as they connect and extend outward from the airflow port. Finally, the thickness of the airflow port should be enough to not significantly restrict airflow in any way when a user's lips create downward pressure.

Lip shield 16 curves convexly around the user's mouth and lips protecting the anatomy of the orbicularis oris muscle from direct contact as can be appreciated in FIG. 5. Additionally, the lip shield curves slightly longitudinally to conform to the tooth cylinder of the skull. The preferred shape of the lip shield is generally oval, with curved angles at its left and right outside edges. The lip shield is fairly thin in nature, approximately ⅛" to ¼" thickness, tapering to its ends.

Rotatable dial valve member 44 is snapped into the recessed channels within valve body 40, thus assembled ready for use. Once snapped together valve dial 44 rotates with manual pressure and clicks into desired levels of resistance, or no resistance to airflow at all. The six position level markers shown in the preferred embodiment of FIG. 1 is for illustration purposes only. The actual number of resistance levels incorporated into the device may be infinite as the valve can turn from (near) 0% restriction resistance to 99% restriction resistance of airflow and all amounts in between. For example, one could configure the dial with 100 levels of resistance, one level per percentage point of resistance up to 100% (full closure), at which point the user would breathe only though the nose or from around the mouthguard itself.

For best fit and performance, cardiorespiratory fitness optimizer apparatus 10 may be molded with a more firm than flexible material as to not allow tooth pads 24, 26 to contract when bitten down upon so at to not allow the front teeth to contact each other. It is preferable cardiorespiratory fitness optimizer apparatus 10 with mouthpiece 12 be sold as a ready-made or non-moldable mouthpiece. However, it is contemplated as being beneficial to allow a moldable, customizable portion which may be overlaid upon the top of a more permanent mouthpiece portion which may allow a more custom fit for users.

In the preferred embodiment of the present invention the entire body portion, lip shield, airflow channel structure and tooth pads are a one-piece molding of an elastomer, such as an FDA approved siliconized rubber or plastic having a durometer in the range of 40-70, with an exemplary Shore A hardness. Adjustable valve 18 of cardiorespiratory fitness optimizer apparatus 10 is preferable made of one-piece durable, somewhat flexible, shatterproof plastic or hard siliconized rubber, or similar, that snaps in place into valve seat 42 and is rotated manually for adjustable, two-way airflow resistance. Cardiorespiratory fitness optimizer apparatus 10 is easily assembled and snapped together. The assembled device can be easily cleaned in appropriate antiseptic solutions as so to easily keep oral hygiene to highest standards. Cardiorespiratory fitness optimizer apparatus 10 can be used for a variety of different anaerobic and aerobic applications which improve athletic cardiorespiratory and related performance, improving user's cardiorespiratory muscular endurance and overall efficiency.

Figure 9:
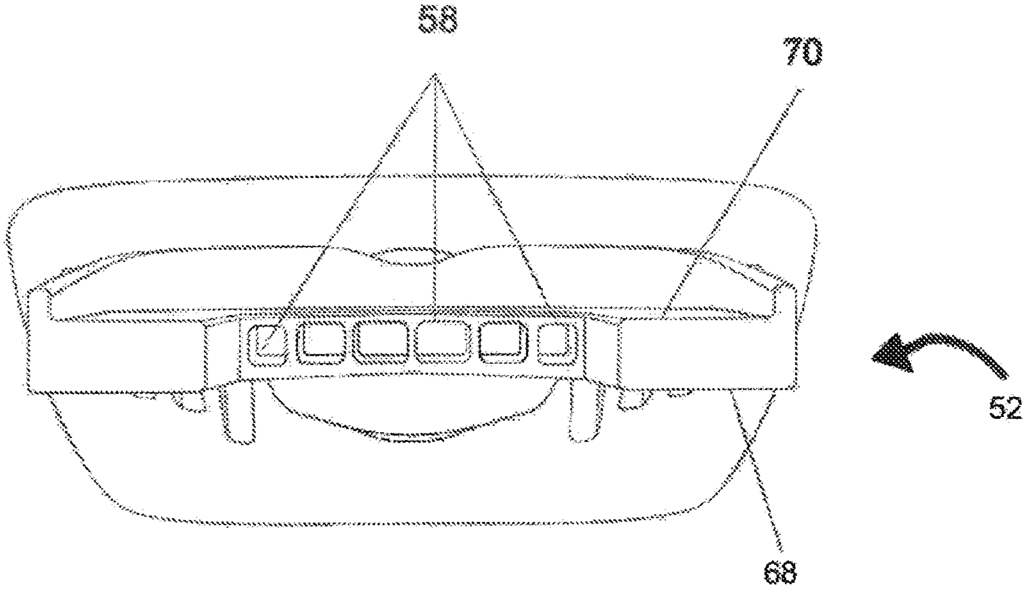
Figure 10:
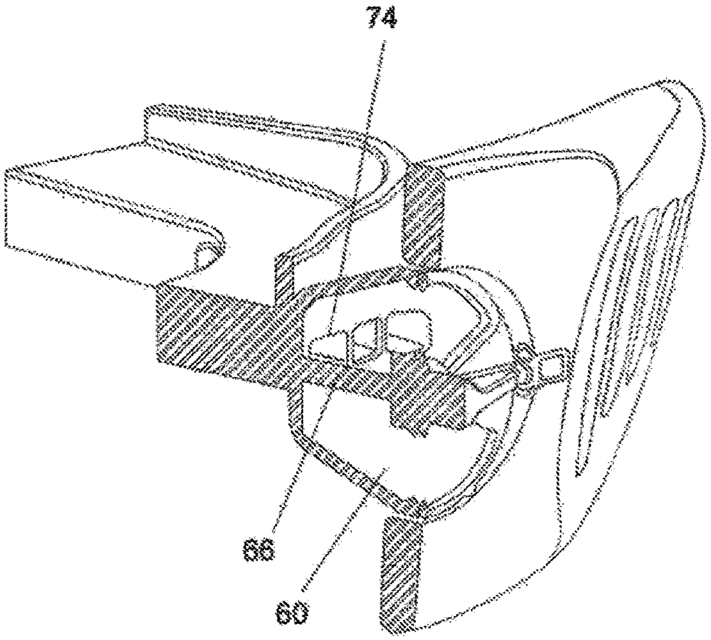
FIG. 10 and FIG. 11 are longitudinal cross-section views of the mouthguard of FIGS. 6-9.
Figure 11:
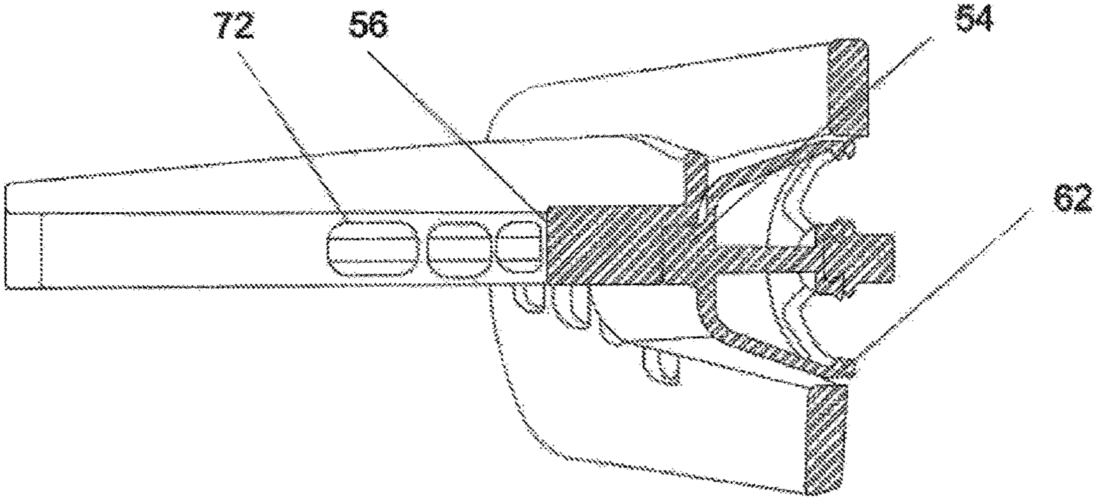
Figure 12:
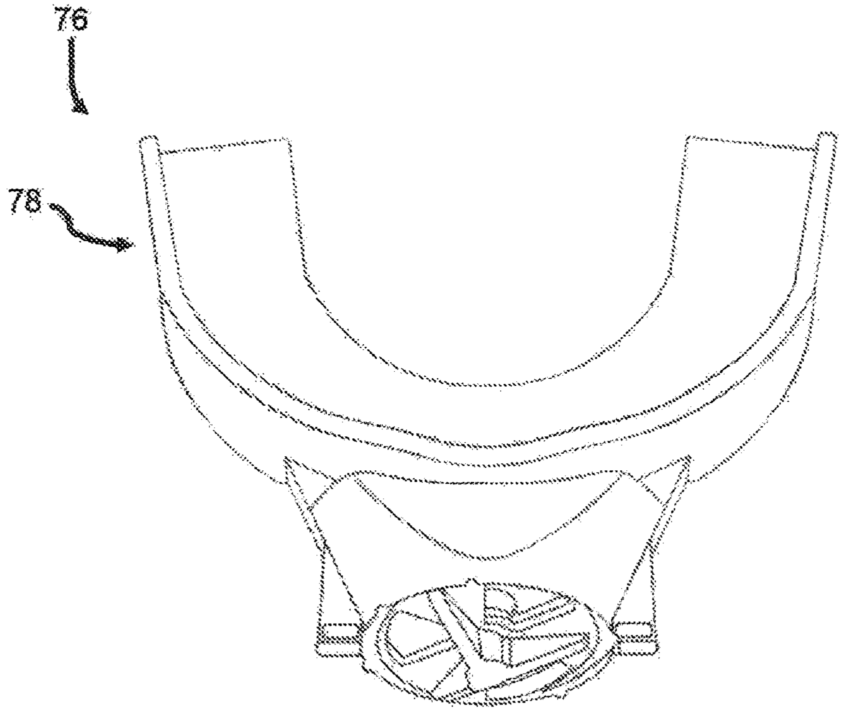
FIG. 12 and FIG. 13 show a third preferred embodiment of an athletic mouthguard with variable airflow-restricting valve according to the invention.
Figure 13:
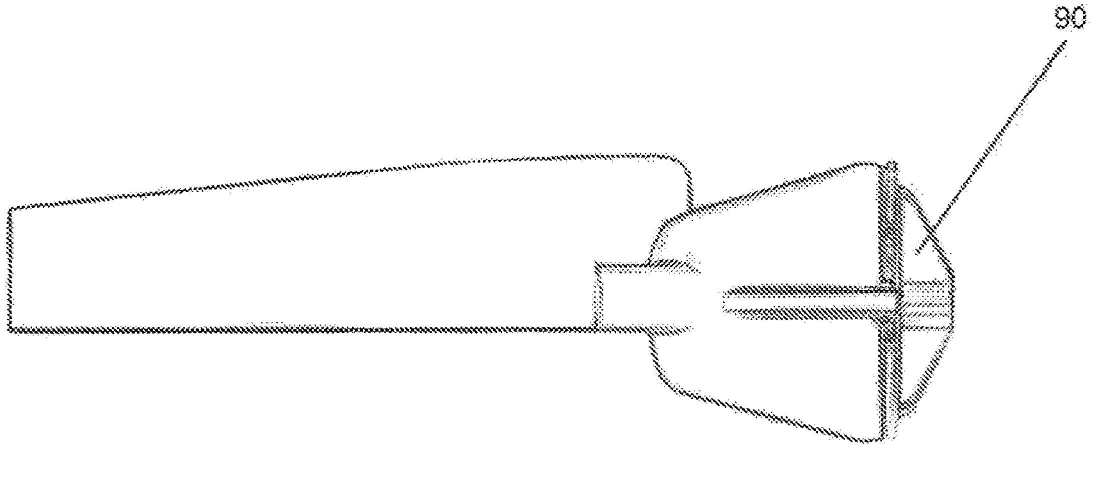
Figure 14:
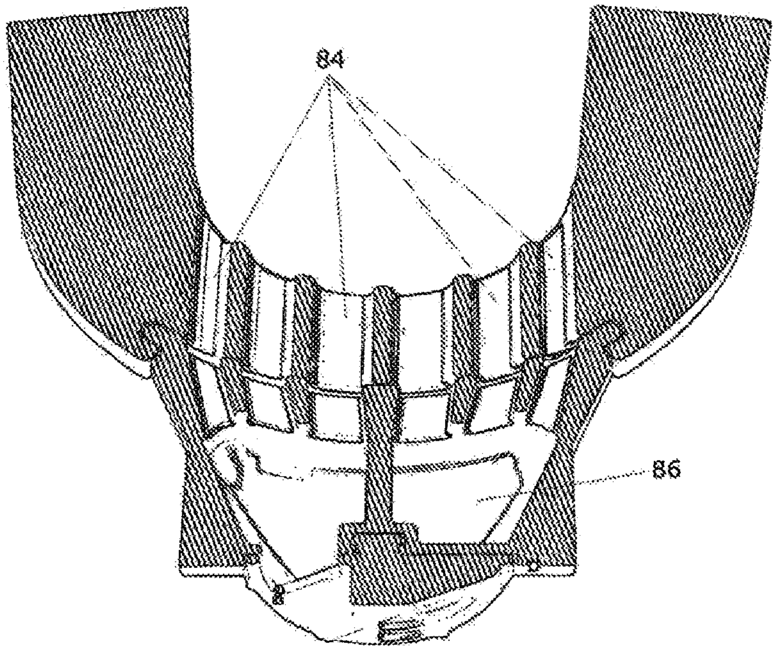
Figure 15:
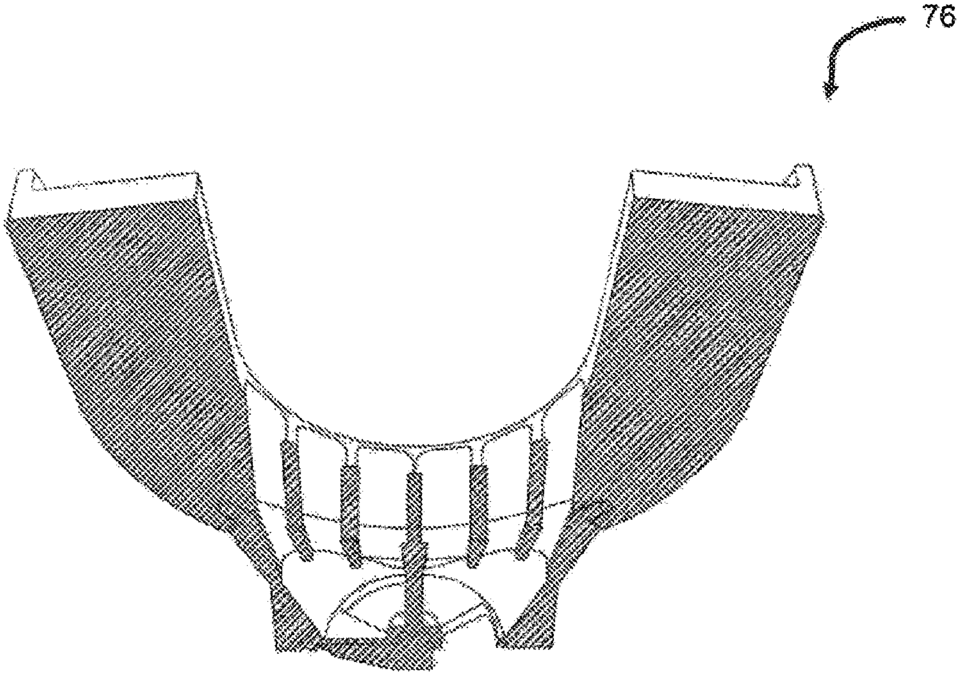

FIGS. 6-12 show a second preferred embodiment of a cardiorespiratory fitness optimizer apparatus 50 with compact variable airflow-restricting valve according to the invention which can be used by athletes wearing helmets with facemasks. Cardiorespiratory fitness optimizer apparatus 50 generally includes mouthpiece 52 with outer sidewall 54 (FIG. 11), inner sidewall 56 and airflow channels 58 (FIG. 9). Manifold section 60 (FIG. 10) has valve seat in a centralized aperture 62 (FIG. 11) and rotatable valve member 64 (FIG. 6) seated in valve seat 62. Rotatable valve member 64 is rotatably connected to central valve member post 66 which allows valve member 64 to rotate.

FIG. 9 shows mouthpiece 52 has lower arcuate tooth bed 68 and upper arcuate tooth bed 70, between which airflow channels 58 pass. Each airflow channel 58 has a first end 72 (FIG. 11) opening within inner sidewall 56 and a second end 74 (FIG. 10) opening within outer sidewall 54.

FIGS. 12-17 show a third preferred embodiment of an athletic mouthguard 76 with compact variable airflow-restricting valve according to the invention which can be used by athletes wearing helmets with facemasks. Mouthguard 76 generally includes mouthpiece 78 (FIG. 12), outer sidewall 80 (FIG. 17), inner sidewall 82 (FIG. 16), airflow channels 84 (FIG. 14), manifold section 86, valve seat in centralized aperture 88 (FIG. 16), and rotatable valve member 90 (FIG. 13) seated in valve seat 88.

Figure 16:
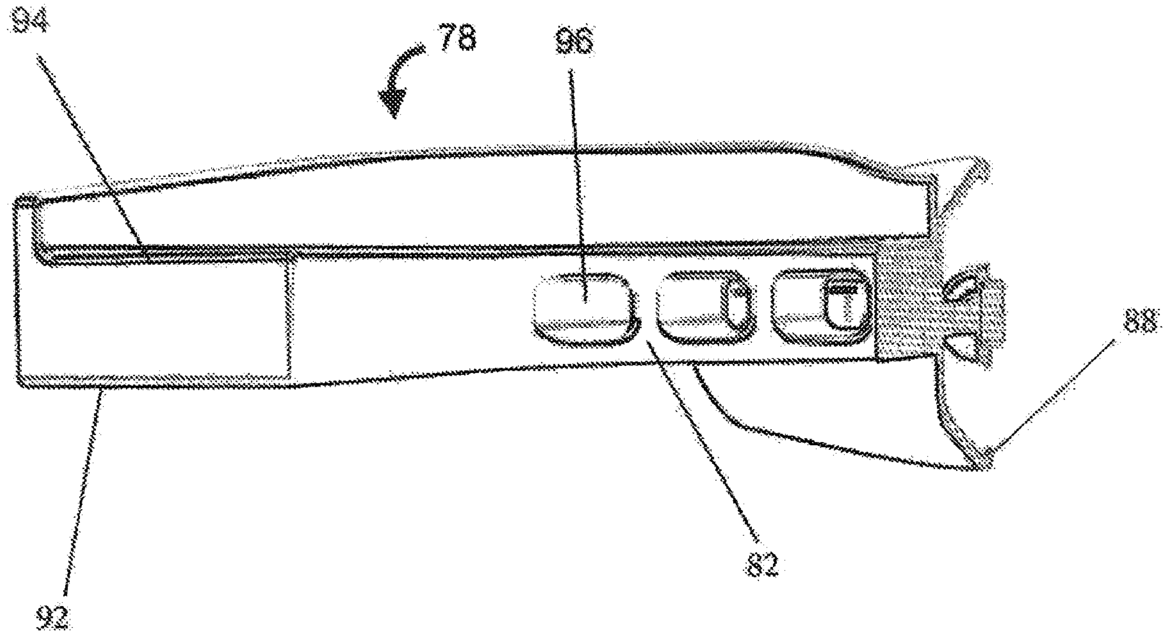
FIG. 16 and FIG. 17 are partial cross-sectional views of the mouthguard of FIGS. 12-13.
Figure 17:
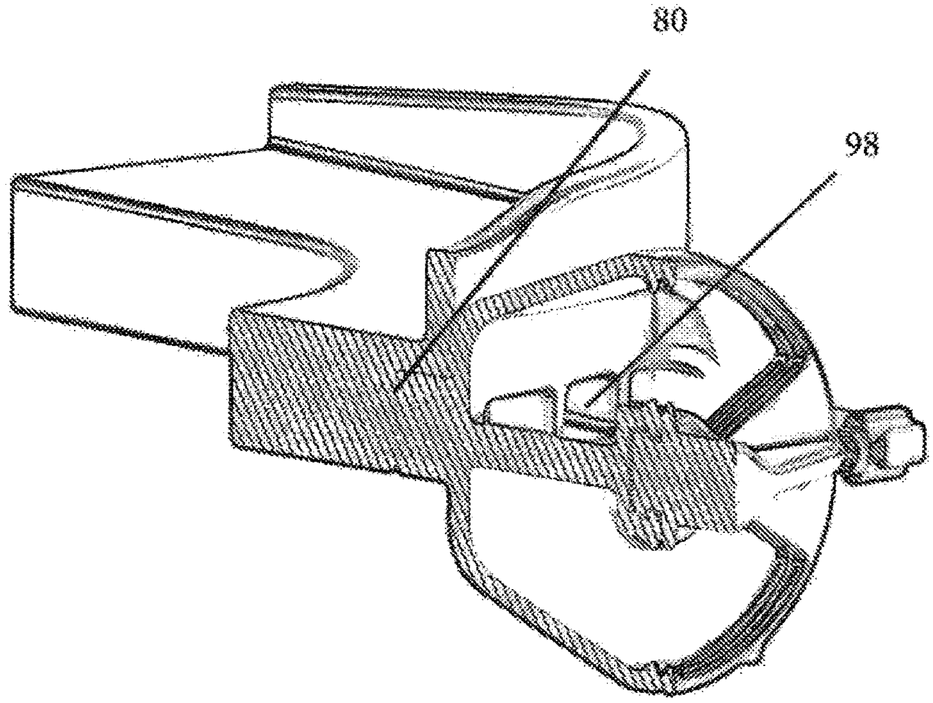
Figure 18:
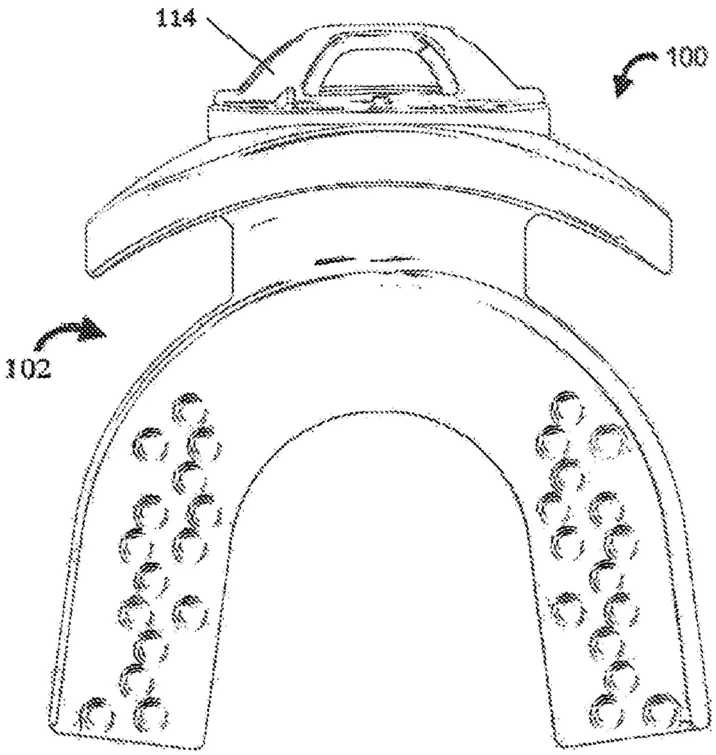
FIG. 18 shows a fourth preferred embodiment of an athletic mouthguard with variable airflow-restricting valve according to the invention.
Figure 19:
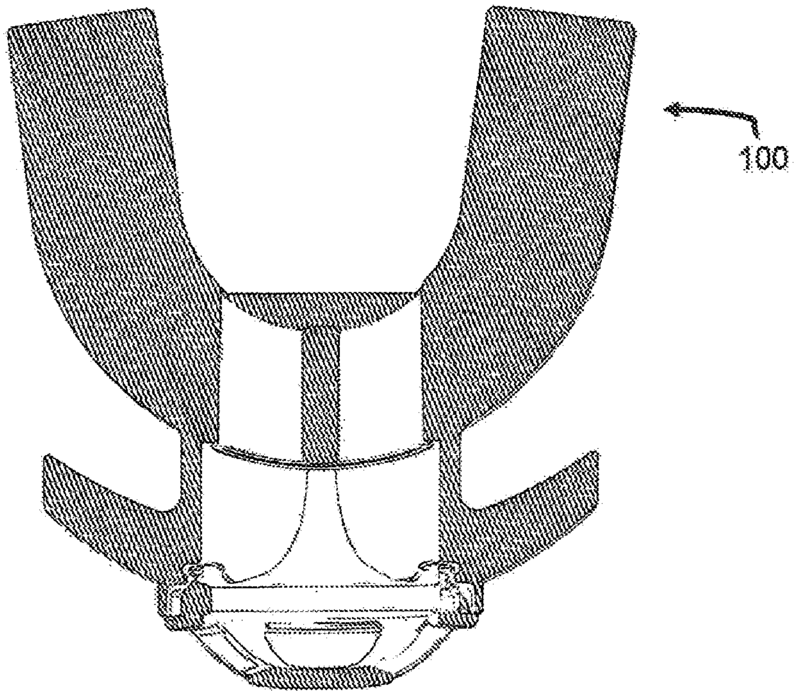
FIG. 19 is lateral cross-section of FIG. 18.
Figure 20:
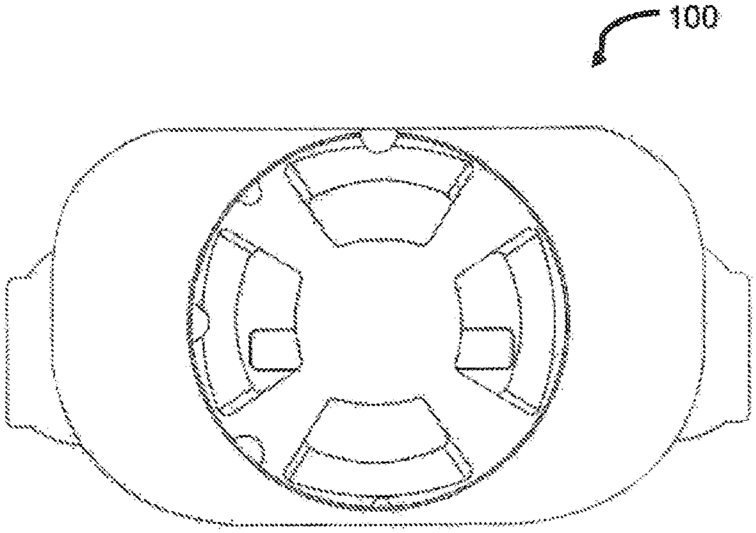
FIG. 20 is a front elevational view of the mouthguard of FIG. 18.
Figure 21:
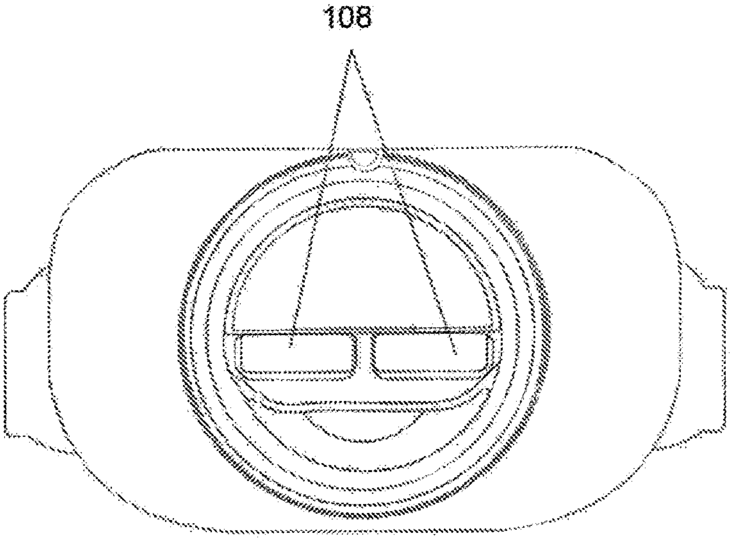
FIG. 21 is the front elevational view of FIG. 20 with the mouthguard's rotatable disc removed.
Figure 22:
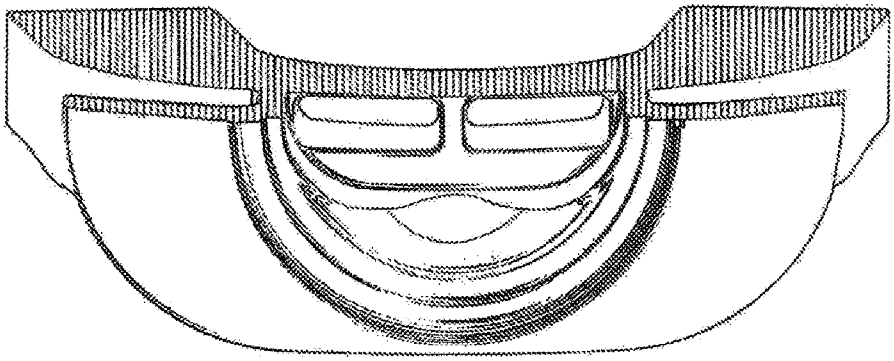
FIG. 22 is a lateral cross-sectional view of FIG. 21.
Figure 23:
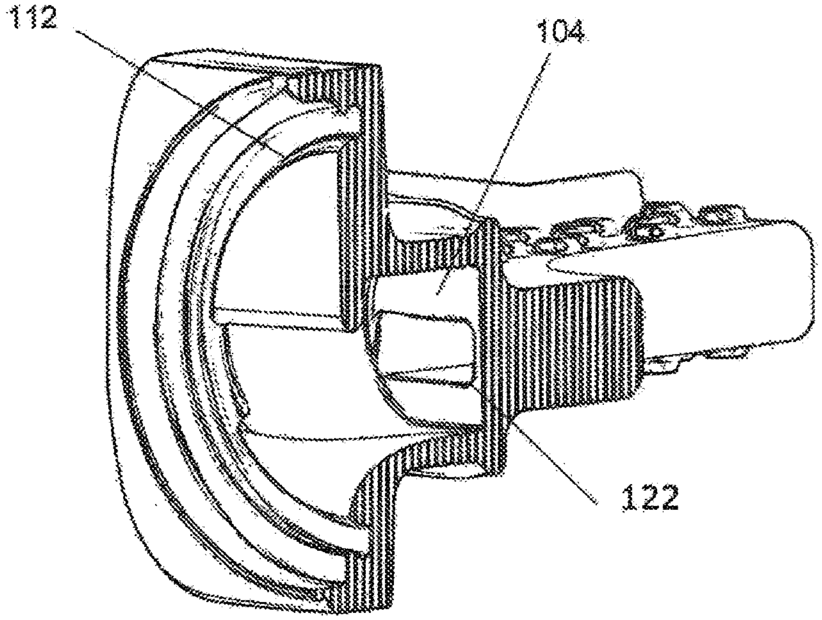
FIG. 23 and FIG. 24 are longitudinal cross-section views of the mouthguard of FIG. 18.
Figure 34B:
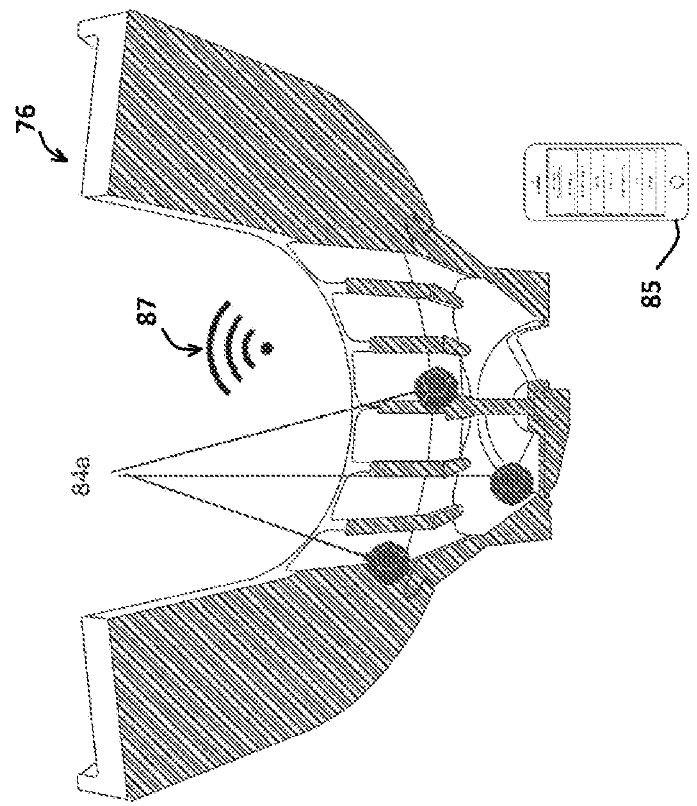
FIG. 34B is a second lateral cross-sectional view of the third preferred embodiment according to the present invention presented in side-by-side relation to FIG. 34A to show the embodiment outfitted with sensors.
Figure 34A:
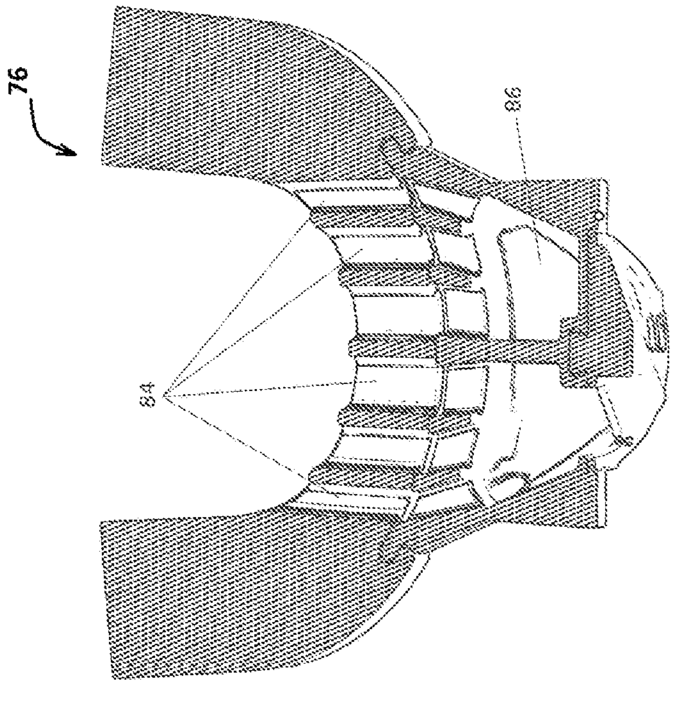
FIG. 34A is a first lateral cross-sectional view of the third preferred embodiment according to the present invention without sensors.

FIG. 16 shows mouthpiece 78 has lower arcuate tooth bed 92 and upper arcuate tooth bed 94, between which airflow channels 84 pass. Each airflow channel 84 has a first end 96 opening within inner wall 82 and a second end 98 (FIG. 17) opening within outer sidewall 80. Comparatively referencing FIG. 16 versus FIGS. 34A through 35, the reader will there consider an optional feature according to the present invention whereby the airflow channels may be outfitted with one or more sensors as at **84*a*. Sensors 84*a* preferably sense pressure waves during inhalation and exhalation events and a propriety software application outfitted upon a separate computing device (exemplified by a mobile communications device as at 85) receives data wirelessly transmitted thereto (as at wireless signal 87) from the sensors 84*a***, translating data into meaningful input.

Figure 35:
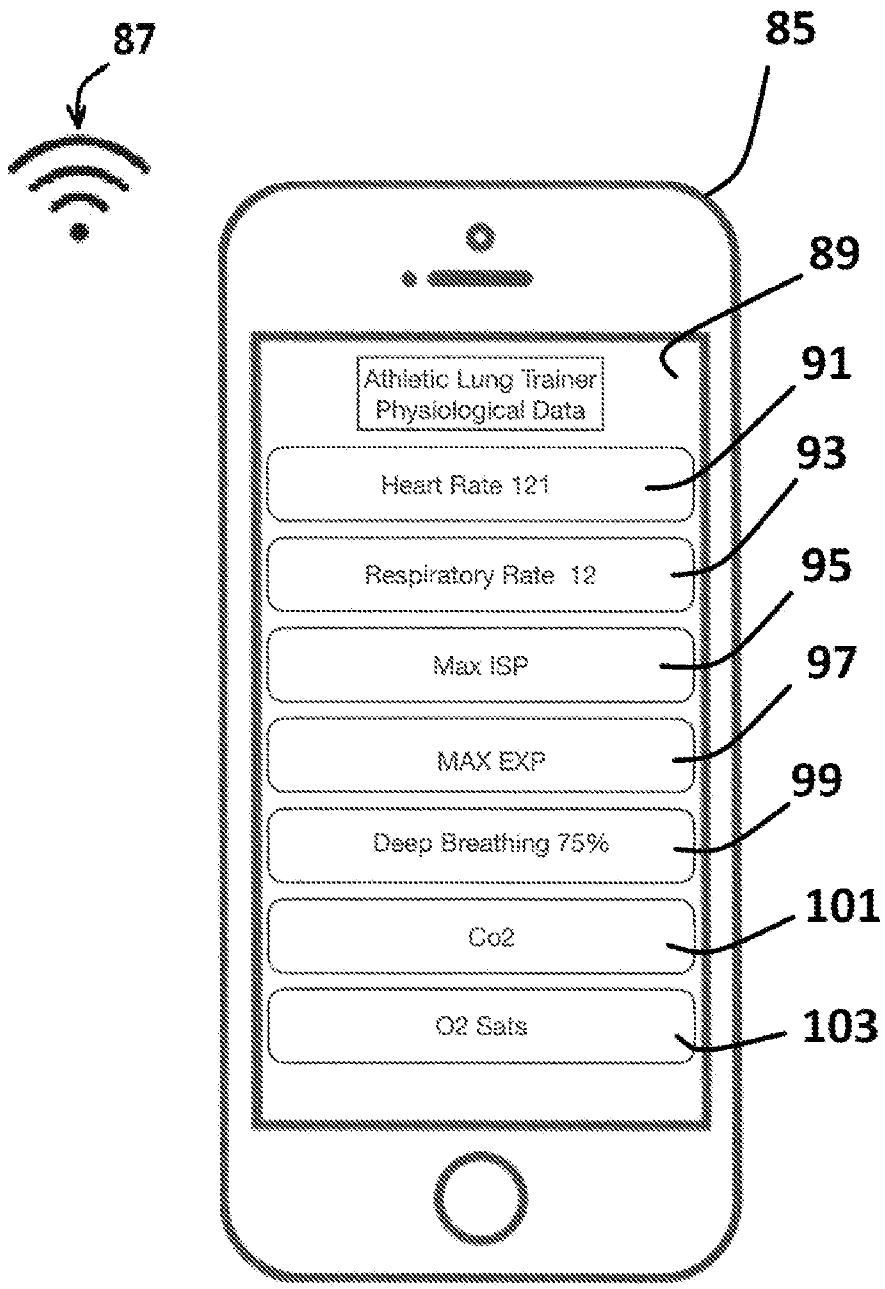
FIG. 35 is a front plan view of a mobile communications device outfitted with proprietary software to communicate with the sensors shown in FIG. 34B and present physiological data derived from sensor data upon the visual display of the mobile communications device.
Figure 36:
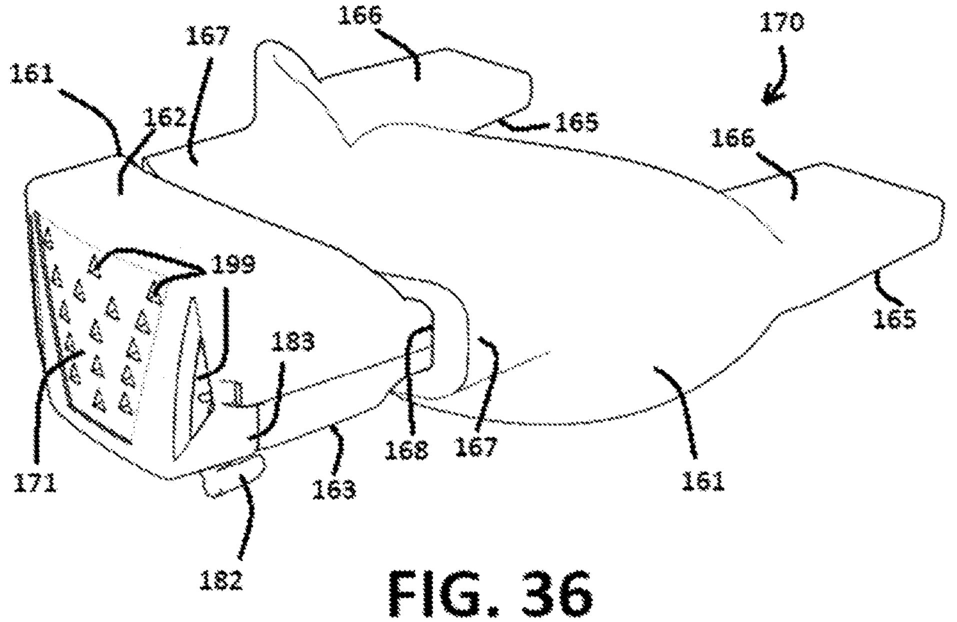
FIG. 36 is a top perspective view of a seventh preferred embodiment of a combination mouthpiece and Respiratory Muscle Training (RMT) device according to the present invention.
Figure 37:
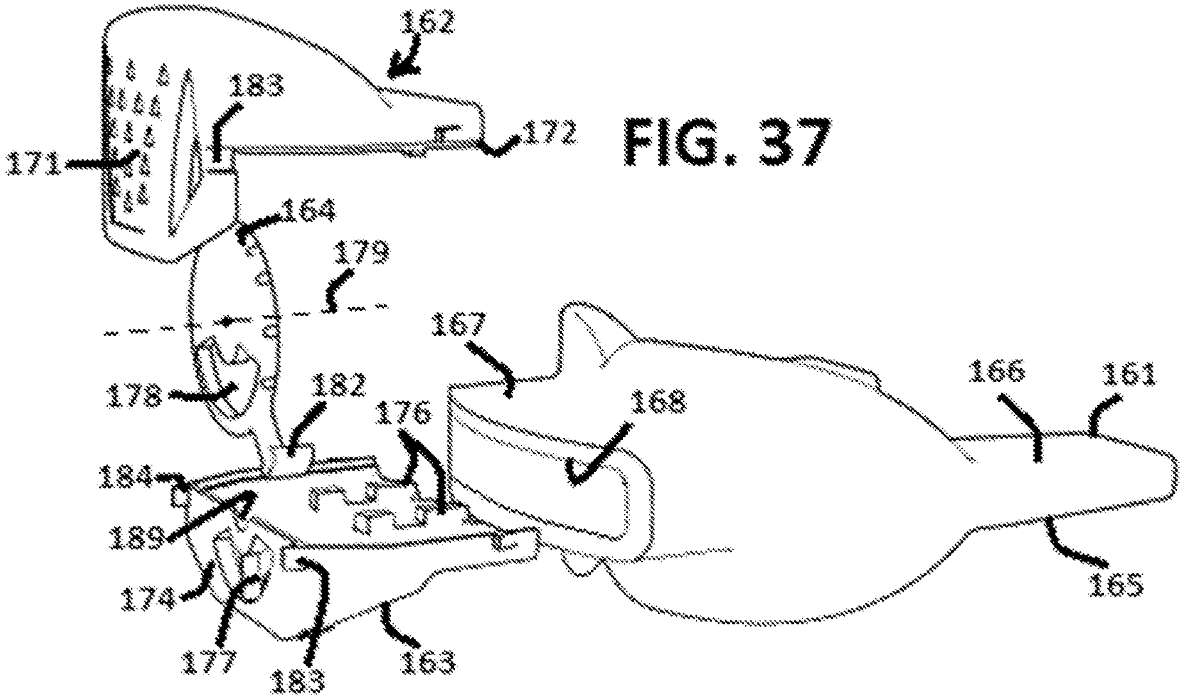
FIG. 37 is a first exploded frontal perspective view of the seventh preferred embodiment according to the present invention.
Figure 38:
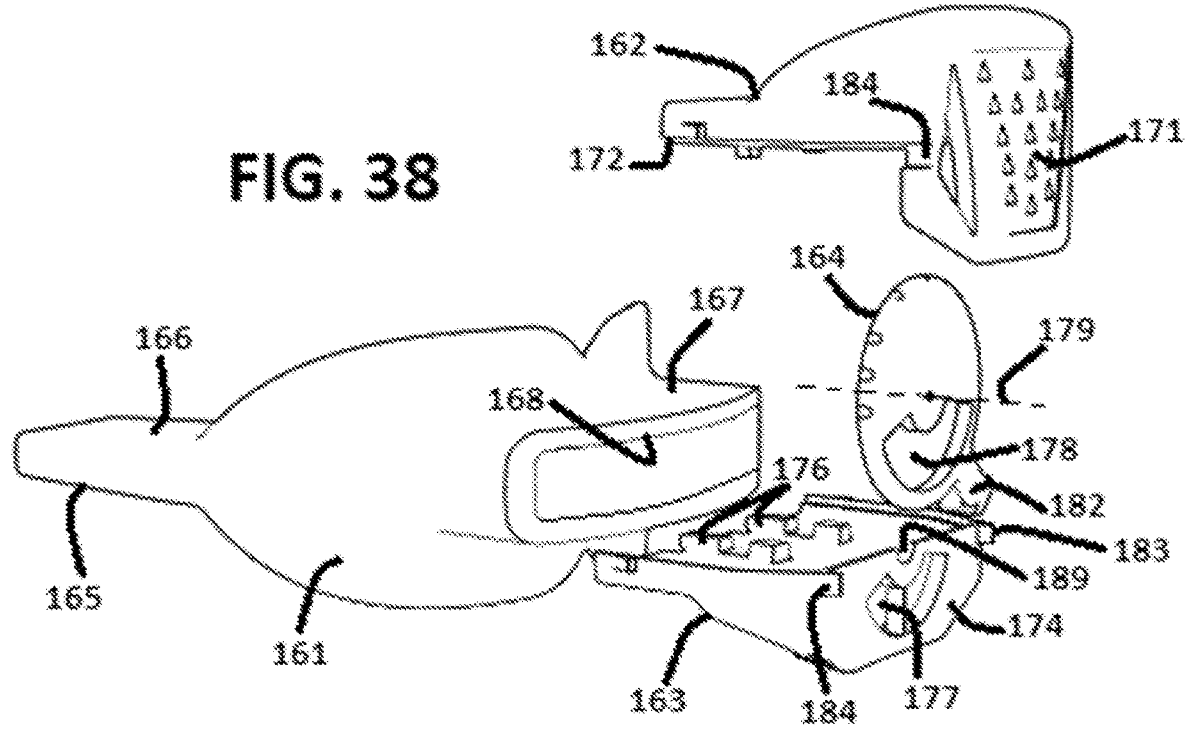
FIG. 38 is a second exploded frontal perspective view of the seventh preferred embodiment according to the present invention.

Referencing FIG. 35, the reader will there consider a mobile communications device as at 85 outfitted with the propriety software application for receiving wireless signals transmitting data from the sensors **84*a* for translating the incoming data into meaningful data points for output upon the visual display 89 of the mobile communications device 85. The propriety software application is configured to communicate with other peripheral hardware and together with the sensors 84*a* is able to output meaningful physiological data points such as heart rate as at 91, respiratory rate as at 93, Maximal Inspiratory Pressure or Max ISP as at 95, Maximal Expiratory Pressure or Max EXP as at 97, deep breathing percentage as at 99; $CO_2$ levels as at 101; and $O_2$ saturation as at 103. Sensors 84*a*** in combination with the software application thereby help users monitor their physiological data in a more meaningful, proactive manner.

FIGS. 18-25 show a fourth preferred embodiment of an athletic mouthguard with compact variable airflow-restricting valve 100 according to the invention which can be used by athletes wearing helmets with facemasks. Mouthguard 100 generally includes mouthpiece 102, outer sidewall 104 (FIG. 23), inner sidewall 106 (FIG. 24), airflow channels 108 (FIG. 21), manifold section 110 (FIG. 24), a valve seat in a centralized aperture 112 (FIG. 23), and a rotatable valve member 114 (FIG. 18) seated in valve seat 112.

Figure 24:
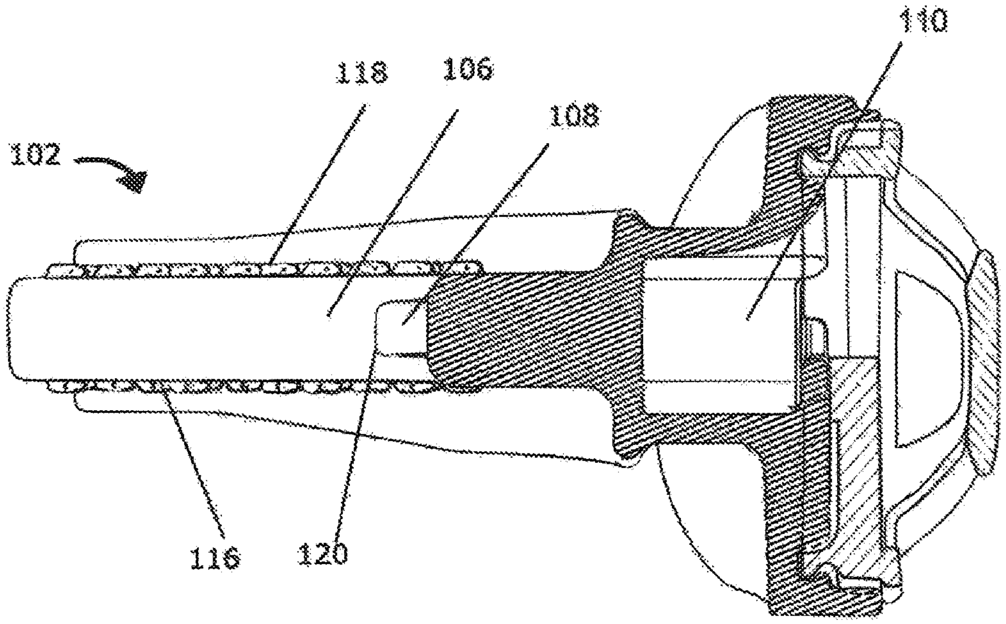
Figure 25:
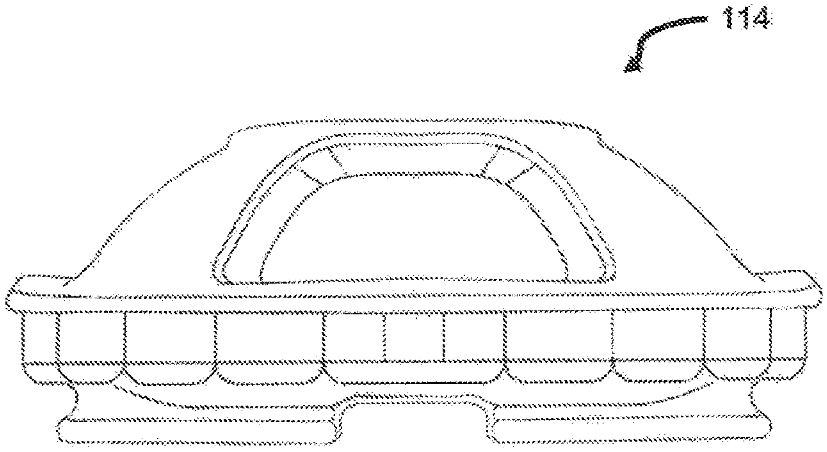
FIG. 25 shows the rotatable disc used in the mouthguard of FIG. 18.
Figure 26:
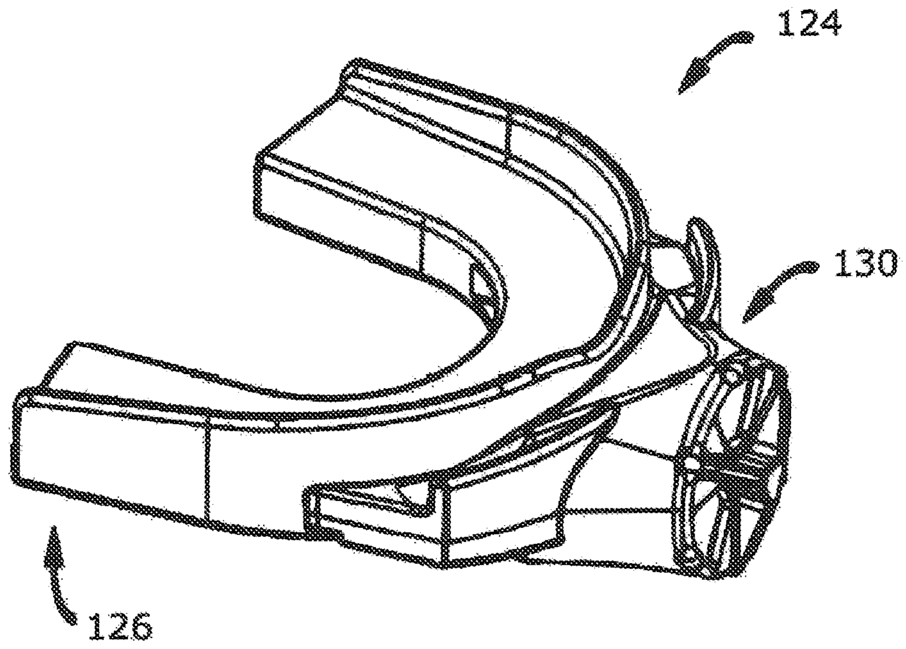
FIG. 26 shows a fifth preferred embodiment of an athletic mouthguard with variable airflow-restricting valve according to the invention.

FIG. 24 shows mouthpiece 102 has lower arcuate tooth bed 116 and upper arcuate tooth bed 118, between which airflow channels 108 pass. Each airflow channel 108 has a first end 120 opening within inner wall 106 and a second end 122 (FIG. 23) opening within outer sidewall 104.

FIGS. 26-29 show a fifth preferred embodiment of an athletic mouthguard with compact variable airflow-restricting valve 124 according to the invention which can be used by athletes wearing helmets with facemasks. Mouthguard 124 generally includes mouthpiece 126 with socket 128 (FIG. 27) which receives three-part airflow-restricting valve 130. Valve 130 generally includes upper valve body portion 132, lower valve body portion 134 and rotatable valve member 136. Valve 130 is shown as being laterally split into upper (132) and lower (134) portions, generally along the mid-line of airflow channels 142. However, it is contemplated valve 130 may also be designed with longitudinally split portions.

The design of this particular embodiment is made to facilitate molding mouthpiece 126 and valve 130 out of different kinds of plastic so each of the respective parts may have different attributes to achieve their desired function. For example, mouthpiece 126 may be molded out of a flexible polyurethane like most athletic mouthpieces are currently made of, while valve 130 may be molded out of a more rigid, but shatterproof thermoplastic to make valve 130 more durable and easy to adjust.

Figure 27:
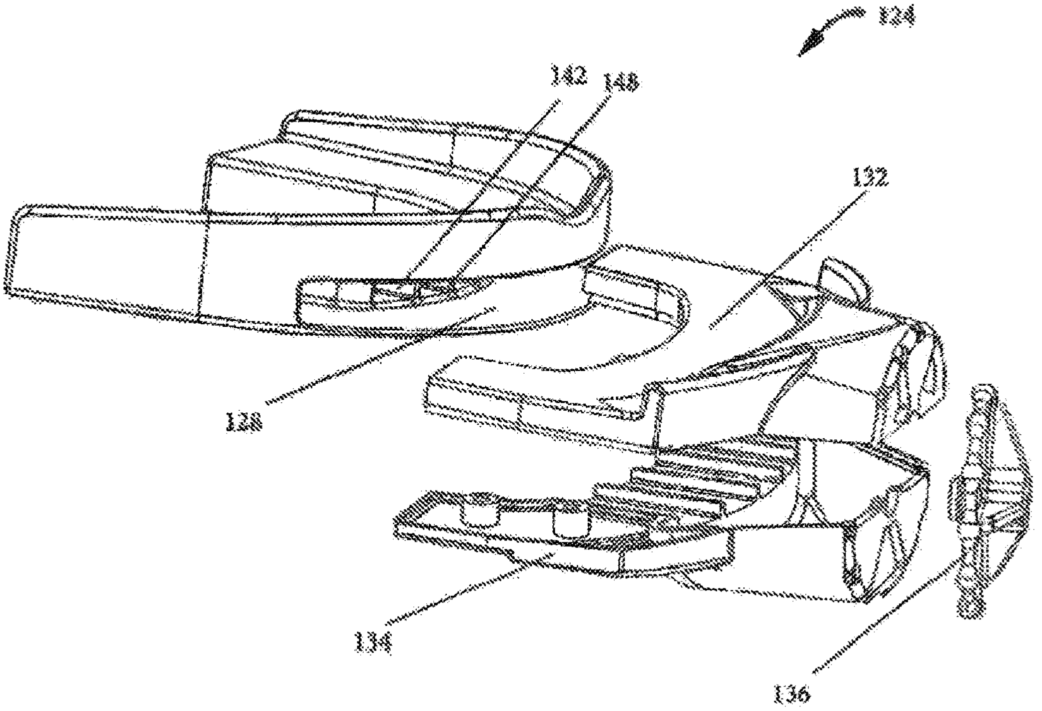
FIG. 27 is an exploded perspective view of the mouthguard of FIG. 26.
Figure 28:
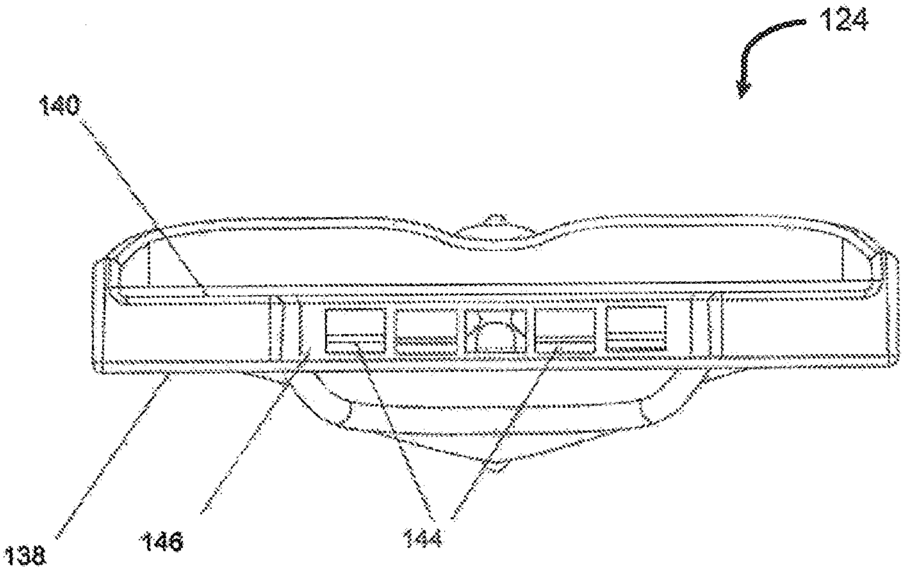
FIG. 28 is a rear elevational view of the mouthguard of FIG. 26.
Figure 29:
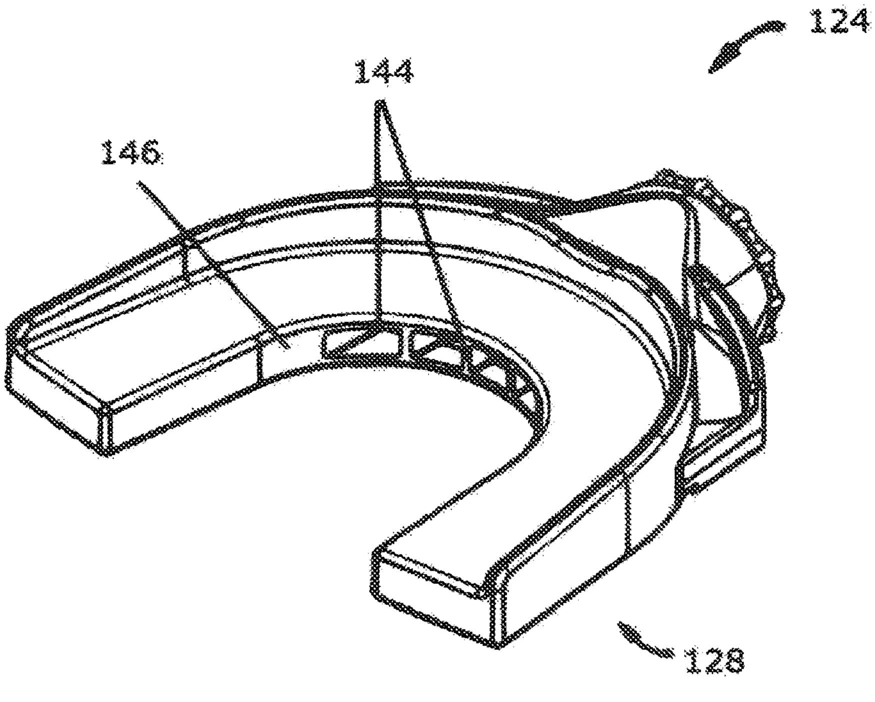
FIG. 29 is a rear perspective view of the mouthguard of FIG. 26.

FIGS. 27-28 show mouthpiece 126 has lower arcuate tooth bed 138 and upper arcuate tooth bed 140, between which airflow channels 142 pass. Each airflow channel 142 has a first end 144 opening with inner wall 146 and a second end 148 opening within socket 128.

Figure 30:
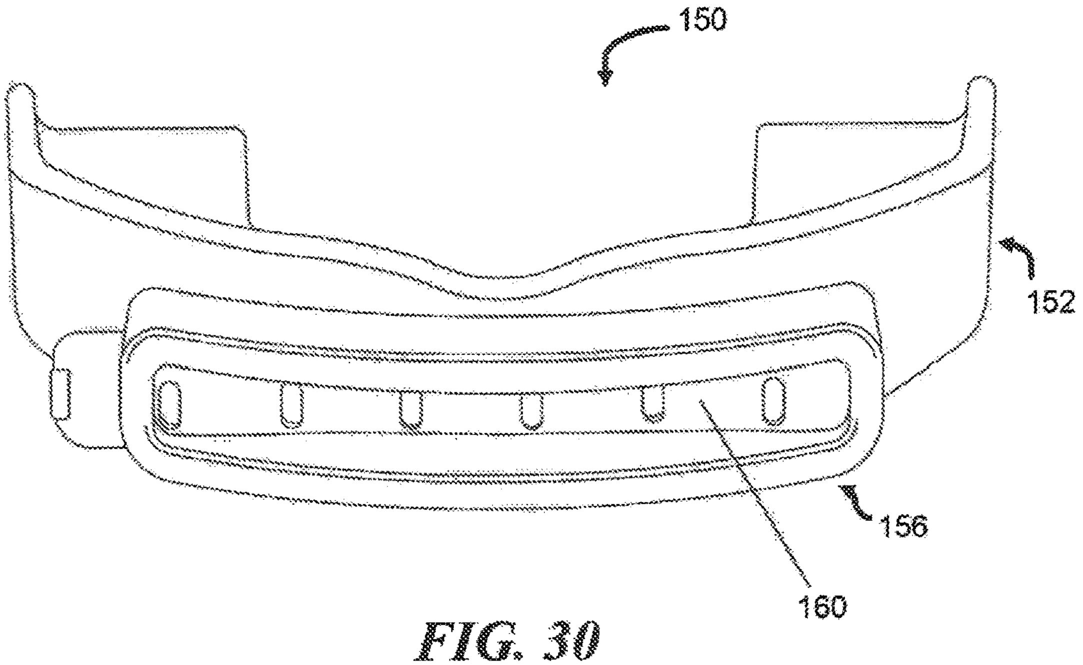
FIG. 30 shows a sixth preferred embodiment of an athletic mouthguard with variable airflow-restricting valve according to the invention.
Figure 31:
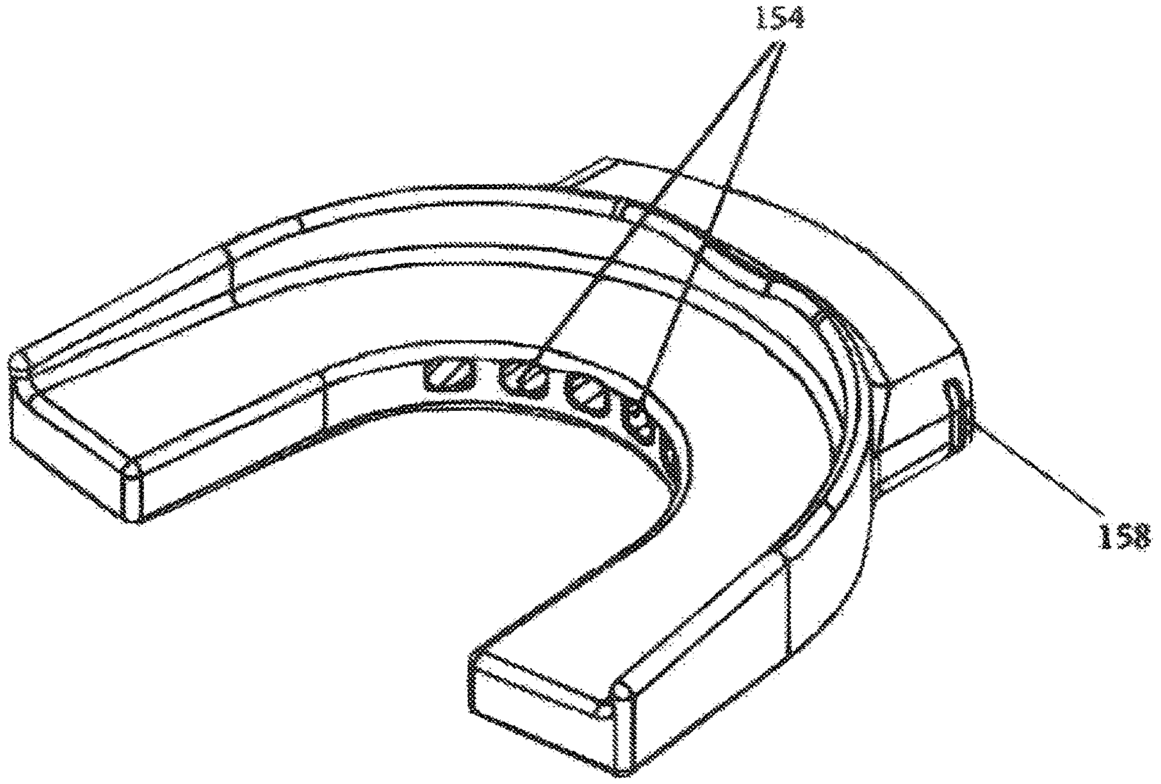
FIG. 31 is a rear perspective view of the mouthguard of FIG. 30.
Figure 32:
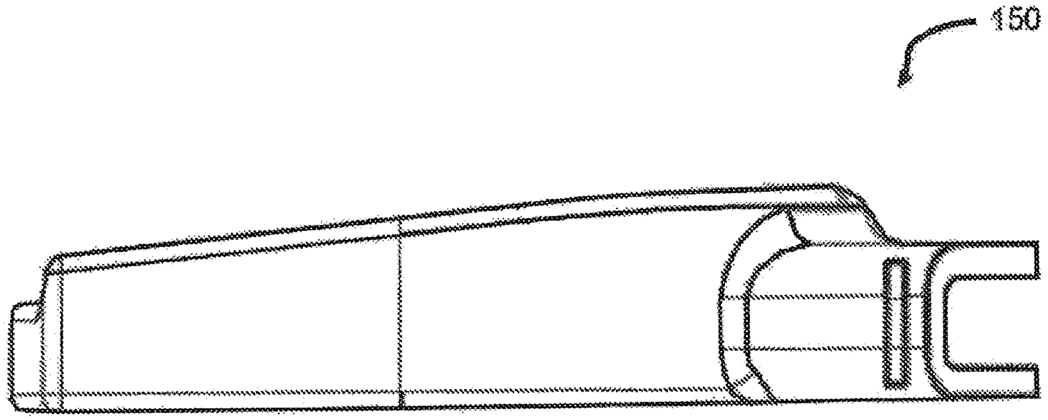
FIG. 32 is a side elevational view of the mouthguard of FIG. 30.
Figure 33:
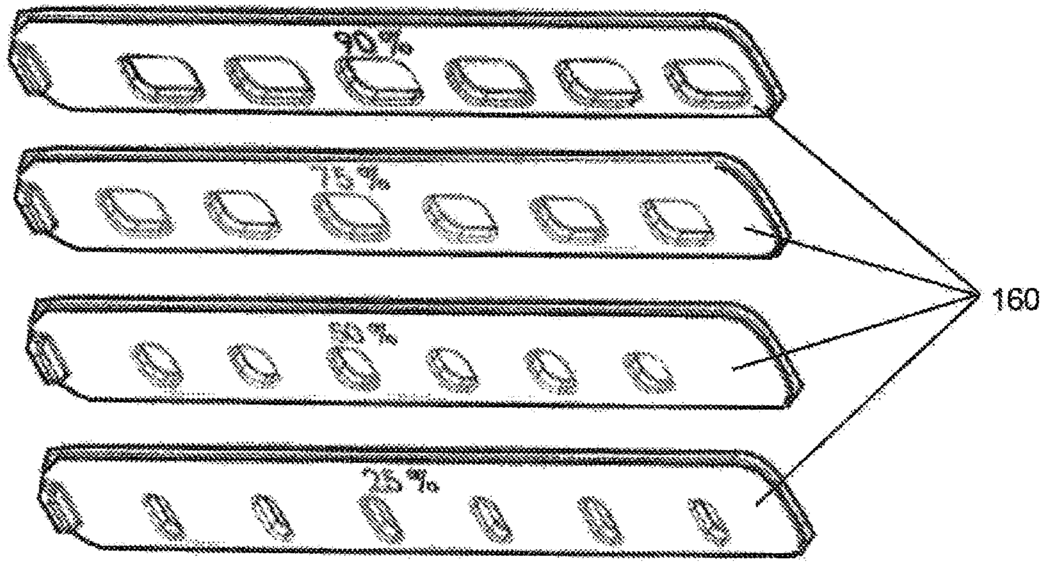
FIG. 33 shows several restricting valve members which may be used in the mouthguard of FIG. 30.

FIGS. 30-32 show a sixth preferred embodiment of a cardiorespiratory fitness optimizer apparatus 150 with variable airflow-restricting valve according to the invention. Cardiorespiratory fitness optimizer apparatus 150 generally includes mouthpiece 152 with integrated airflow channels 154 and adjustable airflow-restricting valve 156. Valve 156 has valve seat opening 158 through which valve members 160 slide. FIG. 33 shows valve members 160 of varying levels of restriction which may be used with cardiorespiratory fitness optimizer apparatus 150. Another contemplated version of this embodiment involves lowering the complexity of its manufacture by molding cardiorespiratory fitness optimizer apparatus 150 in one-piece construction, where valve member 160 is integrally molded into airflow-restricting valve 156. Several of these one-piece construction mouthguards of varying levels of airflow restriction may be sold together as a color-coded set.

Referring now to FIGS. 36-41, the reader will there consider a further cardiorespiratory fitness optimizer apparatus or seventh preferred embodiment 170 according to the present invention. A modified or first alternative embodiment 180 according to the present invention is depicted in FIGS. 42-45. The cardiorespiratory fitness optimizer apparatus 170 is designed to optimize cardiorespiratory fitness in keeping with all other embodiments described in these specifications. The cardiorespiratory fitness optimizer apparatus 170 preferably comprise, in combination, a mouthpiece as at 161, an upper valve housing section as at 162, a lower valve housing section as at 163, and a wheel valve element as at 164.

The mouthpiece 161 preferably comprises a lower arcuate tooth bed as at 165, an upper arcuate tooth bed as at 166, and an anterior mouth or manifold section as at 167. The anterior mouth or manifold section 167 preferably comprises a valve-receiving orifice as at 168 and a series of mouthpiece apertures 169 situated posterior to the valve-receiving orifice 168 that extend intermediate the valve-receiving orifice 168 and the lower and upper arcuate tooth beds 165/166. Airflow is thereby enabled from the valve-receiving orifice 168 through the series of mouthpiece apertures 169.

A valve assembly, receivable at the valve-receiving orifice 168, is preferably provided by way a housing assembly enclosing the wheel valve element 164. The valve assembly may thus preferably comprise the upper valve housing section 162 and the lower valve housing section 163. The upper valve housing section preferably comprises an apertured anterior grill portion as at 171, a posterior upper housing edge as at 172, and a series of upper channel-forming formations as at 173. The upper channel-forming formations 173 preferably extend in parallel relation to one another intermediate the apertured anterior grill portion 171 and the posterior upper housing edge 172. The apertured anterior grill portion comprises a series of air-letting apertures as at 199.

The lower valve housing section 163 preferably comprises an anterior window portion as at 174; a posterior lower housing edge as at 175; and a series of lower channel-forming formations as at 176. The series of lower channel-forming formations 176 preferably extend in parallel relation to one another intermediate the anterior window portion 174 and the posterior lower housing edge 175. The anterior window portion 174 preferably comprises an arcuately shaped air-letting housing window as at 177. The wheel valve element 164 preferably comprises an arcuately shaped air-letting wheel window 178 and an axis of rotation as at 179. The wheel valve element 164 is received intermediate the upper and lower valve housing sections 162 and 163 such that the air-letting housing window 177 and the air-letting wheel window 178 are in variable alignment with one another with the axis of rotation 179 enabling said variable alignment.

In other words, the upper and lower valve housing sections 162 and 163 are attachable to one another for enclosing the wheel valve element 164 and together form the valve assembly, which valve assembly is removable from the mouthpiece 161. The upper channel-forming formations 173 join or abut the lower channel-forming formations 176 to form a series of air-letting channels (as at 181U at the upper valve housing section 162 and at 181L at the lower valve housing section 163) through the valve assembly. The posterior upper housing edge 172 joins or abuts the posterior lower housing edge 175 to form a channel outlet, which channel outlet is insertable into the valve-receiving orifice 168 such that the series of air-letting channels are placed into alignment with the series of mouthpiece apertures 169. The axis of rotation 179 enables a user to selectively rotate the wheel valve element 164 in clockwise and counter-clockwise directions for selectively maximizing or minimizing window-to-window alignment of the air-letting housing window 177 and the air-letting wheel window 178 for increasing and decreasing airflow resistance therethrough for working lung muscles during both inhalation and exhalation activity.

To help the user more easily rotate the wheel valve element 164, the wheel valve element may preferably further comprise a radially extending arm as at 182. In other words, the radially extending arm 182 enables the user to more easily selectively rotate the wheel valve element in clockwise and counter-clockwise directions. Further, the cardiorespiratory fitness optimizer apparatus 170 may further provide a valve housing assembly comprising laterally opposed arm-stop structures. A first arm-stop structure 183 of the laterally opposed arm-stop structures limits rotation in a first direction and signals maximal window-to-window alignment. A second arm-stop structure 184 of the laterally opposed arm-stop structures limits rotation in a second direction and signals minimal window-to-window alignment.

Figure 39:
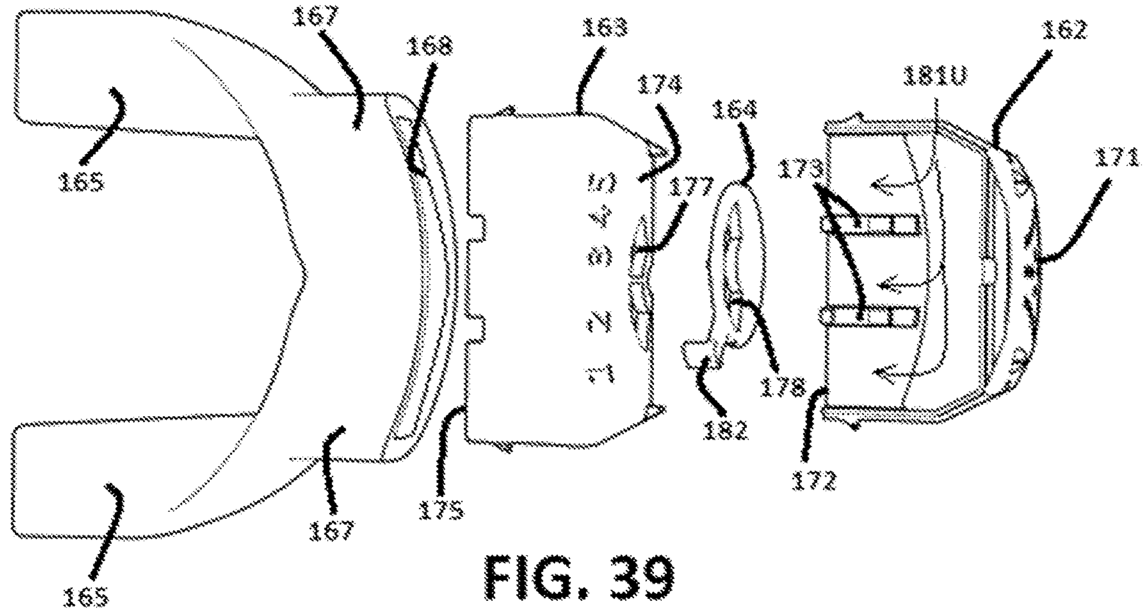
FIG. 39 is an exploded bottom perspective view of the seventh preferred embodiment according to the present invention showing from left to right a mouthpiece, a lower valve portion, a valve wheel-lever combination, and an upper valve portion.
Figure 40:
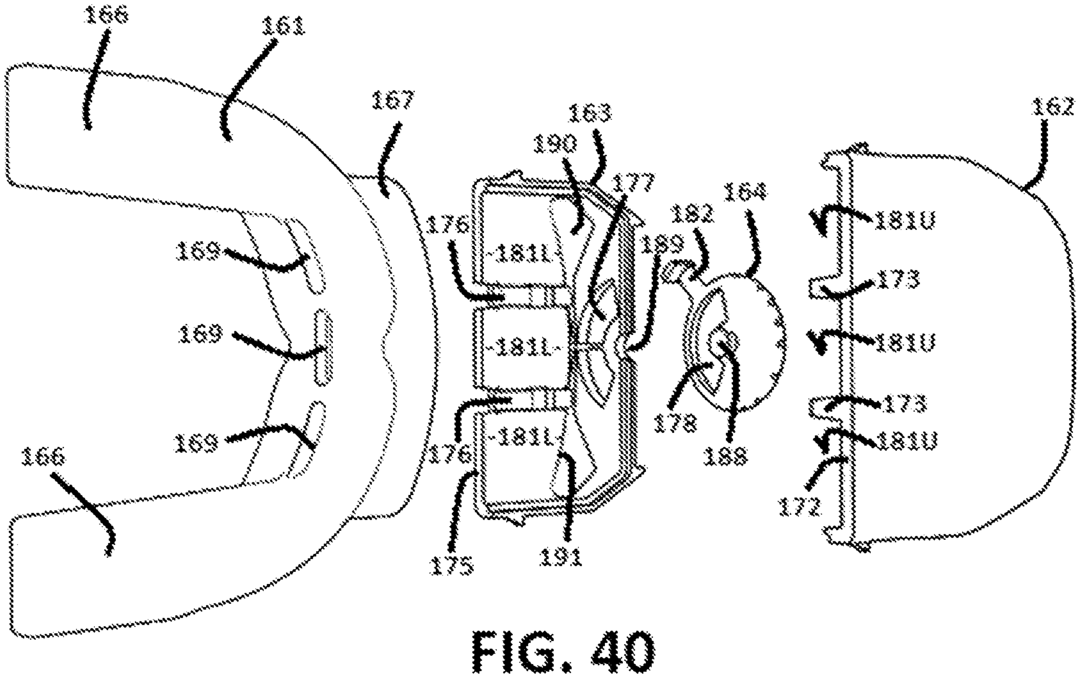
FIG. 40 is an exploded top perspective view of the seventh preferred embodiment according to the present invention showing from left to right the mouthpiece, the lower valve portion, the valve wheel-lever combination, and the upper valve portion.

Referencing FIG. 39, the reader will there note numbered indicia on the ventral side of the lower valve housing section 163. The embodiment there shown preferably provides roughly 25% resistance at Level 1 with increasing resistance (and minimizing window-to-window alignment) up to roughly 75% resistance at Level 5. Various embodiments are contemplated that alter the resistance levels. For example, the apparatus 170 could very well be designed to provide a starting resistance Level 1 at roughly 75% resistance up to a Level 5 at roughly 95% resistance for more advanced users or a beginner valve assembly having a valve resistance ranging from 20% to 60% at Level 5.

Figure 41:
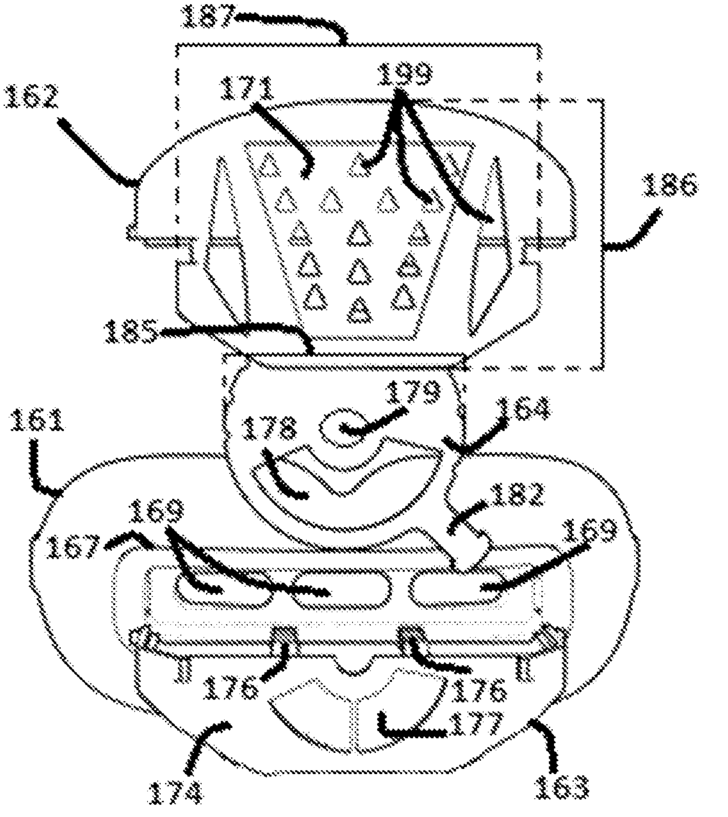
FIG. 41 is an exploded front end perspective view of the seventh preferred embodiment according to the present invention.
Figure 41B:
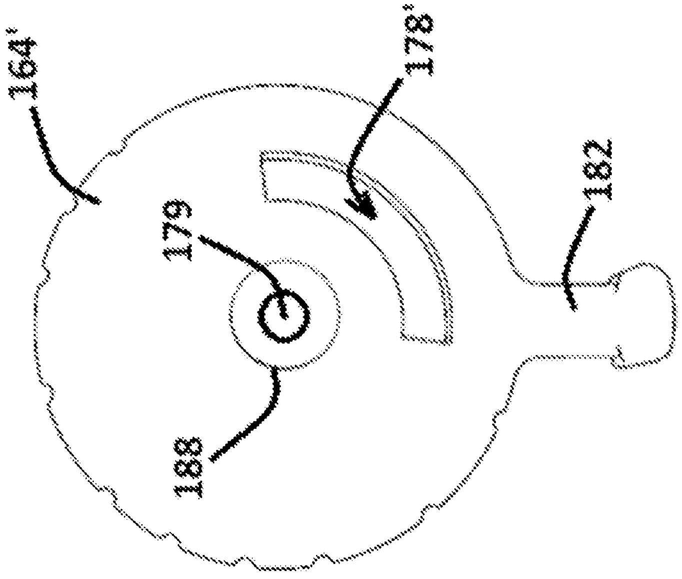
FIG. 41B is a posterior perspective view of a second wheel valve element according to the present invention showing a relatively small air-letting wheel window for relatively increased airflow resistance.
Figure 41A:
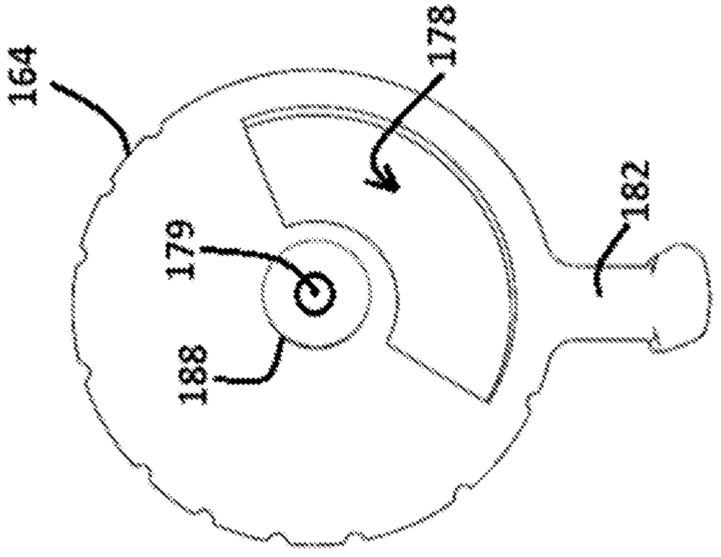
FIG. 41A is a posterior perspective view of a first wheel valve element according to the present invention showing a relatively large air-letting wheel window for relatively decreased airflow resistance.
Figure 42:
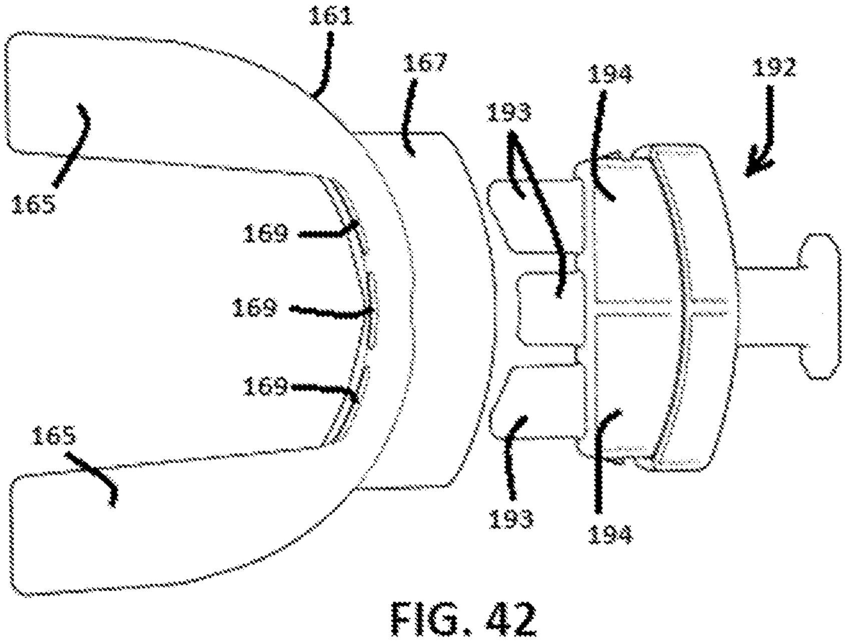
FIG. 42 is an exploded bottom view of a first alternative embodiment according to the present invention showing a mouthpiece from the seventh preferred embodiment and a molded fork or plug element that is insertable into the mouthpiece for maintaining anterior structural formation of the mouthpiece when the valve assembly is remove therefrom.
Figure 43:
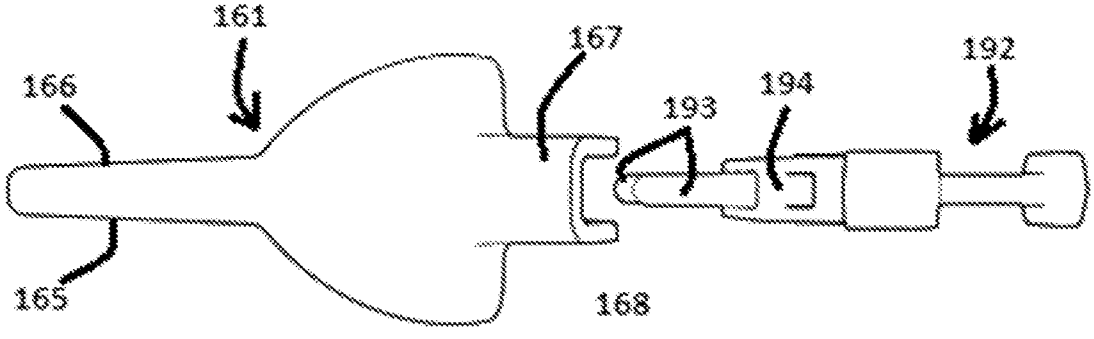
FIG. 43 is an exploded side view of the first alternative embodiment according to the present invention showing from left to right the mouthpiece and the molded fork or plug element.
Figure 44:
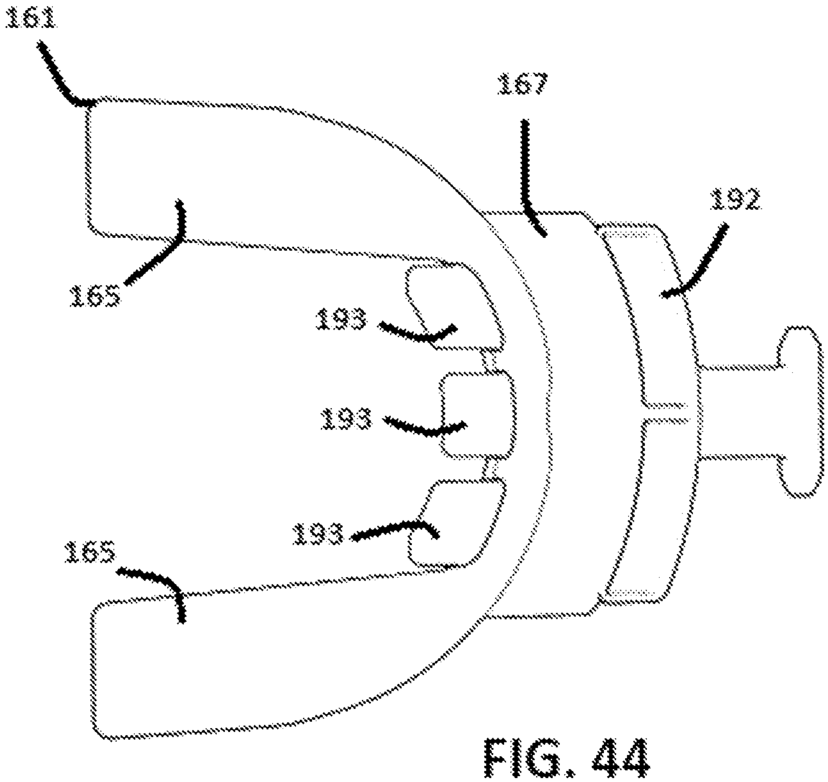
FIG. 44 is a bottom view of the first alternative embodiment according to the present invention showing the mouthpiece and the molded fork or plug element in assembled relation with one another.
Figure 45:
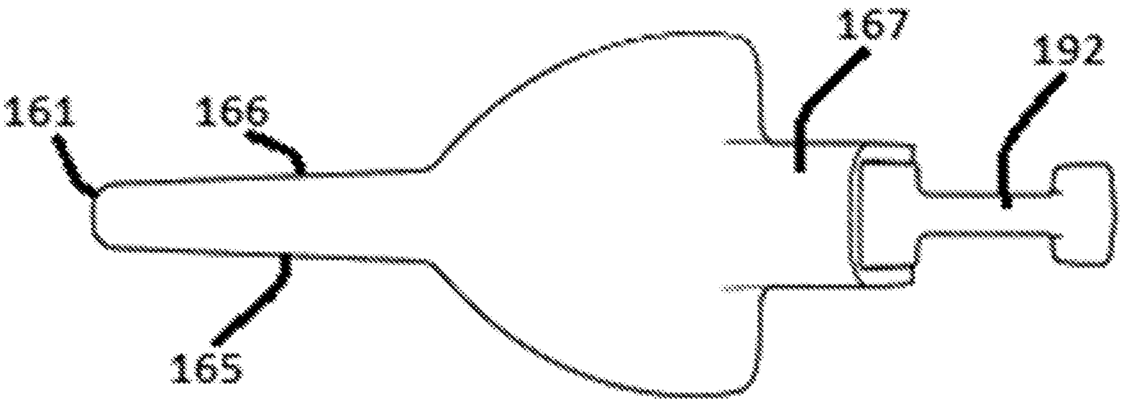
FIG. 45 is a side view of the first alternative embodiment according to the present invention showing the mouthpiece and the molded fork or plug element in assembled relation with one another.

Comparatively referencing FIGS. 41A and 41B, the reader will there consider two alternative wheel valve elements as at 164 and 164'. Wheel valve element 164 shows a relatively larger air-letting wheel window as at 178 whereas wheel valve element 164' shows a relatively smaller air-letting wheel window as at 178'. The dimensioning of the air-letting wheel window may dictate valve resistance with decreasing window dimensions contributing to increased airflow resistance and increasing window dimensions contributing to decreased airflow resistance.

Referencing FIG. 41, the reader will there consider the wheel valve element 164 preferably further comprises a wheel diameter as at 185, and that the apertured anterior grill portion 171 preferably further comprises a dorsal-to-ventral grill height as at 186 and a lateral-to-lateral grill width as at 187. The wheel diameter 185 is preferably lesser than the dorsal-to-ventral grill height 186 and lateral-to-lateral grill width 187 such that the apertured anterior grill portion 171 grill conceals the wheel valve element 164. The reader will recall the air-letting housing window 177 and the air-letting wheel window 178 are each preferably arcuately shaped or resemble an arc length aperture. The arcuately shaped air-letting housing window 177 and the arcuately-shaped air-letting wheel window 178 preferably arc or extend through an arc length in radial inferior adjacency to a wheel axle formation 188 of the wheel valve element 164, which wheel axle formation 188 seats in an axle-receiving notch formation 189 formed in the lower valve housing section 163.

The wheel diameter 185 extends and traverses through a wheel-receiving depression 190 formed in the lower valve housing section 163 posterior to the anterior window portion 174,—which depression 190 preferably comprises an air-diverting lip 191. The air-diverting lip 191 extends from below the air-letting housing window 177 to the series of lower channel-forming formations 176 for re-directing airflow intermediate the air-letting housing window 177 and the series of air-letting channels as at 181U/L. The cardiorespiratory fitness optimizer apparatus 170 may further comprise at least one sensor as at 84A preferably outfitted at or in adjacency to one or more of the air-letting channels as at 181U/L. The at least one sensor 84A senses airflow activity within the valve housing assembly and communicates data to an external device for displaying human readable output upon the external device as described in more detail hereinabove.

As prefaced above, the valve assembly or valve housing assembly is preferably removable from the mouthpiece 161. In this regard, the mouthpiece 161 may be further outfitted with a fork or plug element as at 192. The fork or plug element 192 may preferably comprise a series of tines as at 193 and a back portion as at 194. The series of tines 193 are dimensioned or configured to be receivable in the series of mouthpiece apertures 169 while the back portion 194 is dimensioned or configured to be receivable in the valve-receiving orifice 168 and the anterior manifold section 167.

The fork or plug element f192 is designed to maintain anterior formations of the mouthpiece 161 when the valve housing assembly is removed therefrom as might be the case, for example, when the user may opt to boil and bite the mouthpiece to better form the mouthpiece to the user's mouth anatomy. The fork-like plug element 192 may be used for both boil-n-bite EVA moldable mouthpiece to retain anterior portions of the mouthpiece for more properly receiving the valve assembly, but may also be used by athletes focusing on nasal breathing, not mouth breathing when not using the device, if they so choose to do so. In other words, the fork-like plug element 192 may also be used by athletes training to breathe exclusively through the nose, as this is often preferred method for athletes.

The apparatus 170 works as a force multiplier over every exercise. When airflow is restricted during exercise, a greater load is placed on one's lungs, which in turn causes heart rate to increase to meet exercise oxygen demands. Because of this increase in heart rate, it is much more difficult to complete a full round of exercise with device particularly at higher resistance levels. Over time, however, the body works to adapt to increased lactate in the blood by utilizing lactate for fuel. Over time the lactate threshold is rapidly increased as is VO2 Max (i.e. the maximum rate of oxygen consumption measured during incremental exercise; that is, exercise of increasing intensity).

The mouthpiece is preferably formed for a molded silicone version, but may also be provided as a boil-n-bite version of the device for protective mouthpiece. The apparatus 170 and all the other embodiments are not contemplated to provide mouth protection as a primary function, but rather to be used during non-contact practice sessions, 2-minute drills, conditioning drills, HIIT or HIT training, and any other exercise when there is no or low risk of getting physically hit (e.g. tackling in football or checking in hockey). The apparatus 170, and all other devices should preferably not be used during extended practice sessions or during physical contact sessions. Because the state of the art provides for more advanced athletic protective mouthguards, the cardiorespiratory fitness optimizer apparatuses of these specifications may more preferably be classified or regarded as Advanced Exercise Cardio-Respiratory Training Devices, with secondary functionality to allow basic mouth protection when used without the valve body portion.

The cardiorespiratory fitness optimizer apparatuses according to the present invention have profound impacts on heart and lung function at least in the following areas of concern: (a) Increased Heart Rate; (b) Increased Respiratory Rate; (c) Over time using the device, resting heart rate is decreased along with decreased respiratory rate because cardiorespiratory fitness is significantly increased. Further, the cardiorespiratory fitness optimizer apparatuses according to the present specifications rapidly increase Lactate Threshold and VO2 Max. Further, the cardiorespiratory fitness optimizer apparatuses have numerous known medical device applications including and not limited to treatment for (a) Asthma; (b) COPD; (c) Interstitial Lung Disease; (d) ALS; (e) Cardiac Surgery Rehabilitation; (f) Anxiety prevention; and (g) Stress Management.

While the invention has been illustrated and described in detail in the drawings and foregoing description, the same is to be considered as illustrative and not restrictive in character, it being understood that only preferred embodiments have been shown and/or described and that all changes and modifications that come within the spirit of the invention are desired to be protected. The present invention may be said to essentially provide a cardiorespiratory fitness optimizer apparatus for optimizing cardiorespiratory fitness comprising a mouthpiece and a valve assembly. The mouthpiece comprises a lower tooth bed, an upper tooth bed, and a manifold portion. The manifold portion comprises a valve-receiving orifice and at least one mouthpiece aperture extending intermediate the valve-receiving orifice and the lower and upper tooth beds.

The valve assembly comprises an anterior grill portion, a channel outlet portion, at least one channel formation extending intermediate the anterior grill portion and the channel outlet portion, and a wheel valve element. The wheel valve element comprises an air-letting window in fluid communication with the anterior grill portion and the at least one channel formation. The channel outlet is matable to the valve-receiving orifice such that the at least one channel formation is in fluid communication with the at least one mouthpiece aperture. An axis of rotation of the wheel valve element enables a user to selectively rotate the wheel valve element in clockwise and counter-clockwise directions for selectively increasing and decreasing airflow resistance therethrough for working lung muscles during both inhalation and exhalation activity.

Stated another way, the present invention essentially provides a cardiorespiratory fitness optimizer apparatus comprising a mouthpiece and a valve assembly. The mouthpiece preferably comprises a lower tooth bed, an upper tooth bed, and a manifold section. The manifold section terminates anteriorly to a centralized valve-receiving orifice and comprises at least one air-letting aperture. The valve assembly is receivable at the centralized valve-receiving orifice and comprises an adjustable aperture, which adjustable aperture may increase and/or decrease airflow resistance therethrough. At least one sensor may be incorporated into the valve assembly for sensing airflow activity within the valve assembly and communicating data relating to said activity to an external device for displaying human readable output upon the external device.

The valve assembly is preferably further configure to be removed from the mouthpiece and is optionally replaceable with a fork or plug element. The plug element according to the present invention comprises at least one aperture plug portion as exemplified by tines 193 and a back portion. The at least one aperture plug portion is dimensioned or configured to be receivable in the at least one mouthpiece aperture, and the back portion is dimensioned or configured to be receivable in the valve-receiving orifice. The fork or plug element maintains anterior formations of the mouthpiece when the valve assembly is removed therefrom.

Accordingly, although the invention has been described by reference to certain preferred embodiments, and certain associated methodologies, it is not intended that the novel arrangement and methods be limited thereby, but that modifications thereof are intended to be included as falling within the broad scope and spirit of the foregoing disclosures and the appended drawings. Insofar as the description above and the accompanying drawings disclose any additional subject matter that is not within the scope of the claims below, the embodiments are not dedicated to the public and the right to file one or more applications to claim such additional embodiments is reserved.

What is claimed is:

1. A cardiorespiratory fitness optimizer apparatus, comprising:

a valve assembly, the valve assembly comprising a valve housing assembly and a wheel valve element enclosed within the valve housing assembly;

at least one section of the valve housing assembly comprising an anterior window portion, the anterior window portion comprising an arcuately-shaped air-letting housing window;

the wheel valve element comprising an axis of rotation and an arcuately-shaped air-letting wheel window, the air-letting housing window and the air-letting wheel window being configured for variable alignment with respect to one another as the wheel valve element is rotated about the axis of rotation;

the wheel valve element being rotatable about the axis of rotation thereby being adjustable for selectively increasing and decreasing airflow resistance through the wheel valve element as the air-letting wheel window is variably aligned with the air-letting housing window during both inhalation and exhalation activity for optimizing cardiorespiratory fitness.

2. The cardiorespiratory fitness optimizer apparatus of claim 1 wherein the valve housing assembly comprises an upper valve housing section and a lower valve housing section, said upper and lower valve housing sections being configured to rotatably house the wheel valve element at anterior portions thereof.

3. The cardiorespiratory fitness optimizer apparatus of claim 2 wherein the lower valve housing section comprises the anterior window portion, the arcuately-shaped air-letting wheel window being positioned at a lower portion of the wheel valve element when the arcuately-shaped air-letting housing window and the arcuately-shaped air-letting wheel window are in full alignment with respect to one another.

4. The cardiorespiratory fitness optimizer apparatus of claim 3 wherein the upper valve housing section comprises an apertured anterior grill portion, the apertured anterior grill portion being configured to cover the anterior window portion when in assembled relation with the lower valve housing portion.

5. The cardiorespiratory fitness optimizer apparatus of claim 4 wherein the wheel valve element comprises a wheel diameter and the apertured anterior grill portion comprises a dorsal-to-ventral height and a lateral-to-lateral grill width, the wheel diameter being lesser than the ventral grill height and lateral-to-lateral grill width such that the apertured anterior grill portion conceals the wheel valve element.

6. The cardiorespiratory fitness optimizer apparatus of claim 5 wherein the wheel diameter extends and traverses through a wheel-receiving depression formed in the lower valve housing section posterior to the anterior window portion.

7. The cardiorespiratory fitness optimizer apparatus of claim 6 wherein the wheel-receiving depression comprises an air-diverting lip.

8. The cardiorespiratory fitness optimizer apparatus of claim 7 wherein the air-diverting lip extends from below the air-letting housing window to an array of lower channel-forming formations for re-directing airflow.

9. The cardiorespiratory fitness optimizer apparatus of claim 3 wherein said upper and lower valve housing sections each comprise channel-forming formations, the channel-forming formations together forming an array of air-letting channels through the valve assembly.

10. The cardiorespiratory fitness optimizer apparatus of claim 9 wherein the array of air-letting channels extends in parallel relation to one another intermediate the wheel valve element and a channel outlet disposed opposite anterior portions of said valve assembly.

11. The cardiorespiratory fitness optimizer apparatus of claim 10 wherein the channel outlet is matable with a valve-receiving orifice of a mouthpiece, the mouthpiece comprising an array of mouthpiece channels, the array of air-letting channels being in alignment with the array of mouthpiece channels when the channel outlet is mated with the valve-receiving orifice.

12. The cardiorespiratory fitness optimizer apparatus of claim 3 comprising at least two wheel valve elements, the at least two wheel valve elements being interchangeable for varying airflow resistance therethrough.

13. The cardiorespiratory fitness optimizer apparatus of claim 12 wherein a first wheel valve element of the at least two wheel valve elements comprises a relatively large air-letting wheel window configured for relatively decreased airflow resistance and a second wheel valve element of the at least two wheel valve elements comprises a relatively small air-letting wheel window configured for relatively increased airflow resistance.

14. The cardiorespiratory fitness optimizer apparatus of claim 1 wherein the wheel valve element comprises a radially extending arm configured to enable a user to selectively rotate the wheel valve element about the axis of rotation.

15. The cardiorespiratory fitness optimizer apparatus of claim 14 wherein the valve housing assembly comprises laterally opposed arm-stop structures cooperable with the radially extending arm and configured to limit rotation of the wheel valve element about the axis of rotation.

16. The cardiorespiratory fitness optimizer apparatus of claim 15 wherein a first arm-stop structure of the laterally-opposed arm-stop structures limits rotation in a first direction and signals maximal window-to-window alignment and a second arm-stop structure of the laterally-opposed arm-stop structures limits rotation in a second direction and signals minimal window-to-window alignment.

17. The cardiorespiratory fitness optimizer apparatus of claim 16 wherein the lower valve housing section comprises a ventral side, the ventral side comprising numbered indicia corresponding to airflow resistance levels as the radially extending arm is rotatably positioned intermediate the laterally-opposed arm-stop structures.

18. The cardiorespiratory fitness optimizer apparatus of claim 1 comprising at least one sensor, the at least one sensor for sensing airflow activity within the valve assembly and communicating data relating to the airflow activity to an external device for displaying human readable output relating to the airflow activity upon the external device.

19. The cardiorespiratory fitness optimizer apparatus of claim 1 wherein the valve assembly is usable in combination with a mouthpiece, the mouthpiece comprising a centralized valve assembly interface and at least one mouthpiece aperture for enabling airflow through the mouthpiece, the valve assembly being matable with the centralized valve assembly interface.

20. The cardiorespiratory fitness optimizer apparatus of claim 19 wherein the valve assembly is removable from the mouthpiece and replaceable with a plug element, the plug element comprising at least one aperture plug portion and a back portion, the at least one aperture plug portion being receivable in the at least one mouthpiece aperture, and the back portion being matable with the valve assembly interface.

* * * * *